(12) United States Patent
Grover et al.

(10) Patent No.: US 7,075,892 B2
(45) Date of Patent: Jul. 11, 2006

(54) TOPOLOGICAL DESIGN OF SURVIVABLE MESH-BASED TRANSPORT NETWORKS

(75) Inventors: Wayne D. Grover, Edmonton (CA); John Doucette, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 991 days.

(21) Appl. No.: 10/016,272

(22) Filed: Nov. 2, 2001

(65) Prior Publication Data

US 2002/0187770 A1 Dec. 12, 2002

Related U.S. Application Data

(60) Provisional application No. 60/245,189, filed on Nov. 3, 2000.

(51) Int. Cl.
*H04L 12/28* (2006.01)
(52) U.S. Cl. ...................... 370/238; 370/256
(58) Field of Classification Search ............... 370/241, 370/248, 254, 255, 256, 257, 258, 404, 216–228, 370/235–240
See application file for complete search history.

(56) References Cited

U.S. PATENT DOCUMENTS

| | | | | |
|---|---|---|---|---|
| 5,850,505 | A * | 12/1998 | Grover et al. | 714/4 |
| 6,052,796 | A | 4/2000 | Croslin | 714/4 |
| 6,154,296 | A | 11/2000 | Elahmadi et al. | 259/119 |
| 6,377,543 | B1 | 4/2002 | Grover et al. | 370/227 |
| 6,404,734 | B1 | 6/2002 | Stamatelakis et al. | 370/227 |
| 6,421,349 | B1 | 7/2002 | Grover | 370/408 |
| 6,510,139 | B1 * | 1/2003 | Yoshida | 370/238 |
| 6,819,662 | B1 * | 11/2004 | Grover et al. | 370/351 |
| 6,937,576 | B1 * | 8/2005 | Di Benedetto et al. | 370/256 |
| 2002/0071392 | A1 | 6/2002 | Grover et al. | 370/241 |

OTHER PUBLICATIONS

A photocopy of Canadian Patent Application No. 2,161,847, filed Oct. 31, 1995 (published May 1, 1997), including drawings and filing certificate, 32 pages.
A photocopy of Canadian Patent Application No. 2,212,933, filed Aug. 13, 1997 (published Feb. 13, 1999), including drawings and filing certificate, 154 pages.

(Continued)

*Primary Examiner*—Dang Ton
*Assistant Examiner*—Phuc Tran
(74) *Attorney, Agent, or Firm*—Christensen O'Connor Johnson Kindness PLLC

(57) ABSTRACT

A method of designing a telecommunications network, the method comprising the steps of A) for all working demand flows required to be routed in the telecommunications network, finding an initial topology of spans between nodes in the telecommunications network that is sufficient for routing all working demand flows, while attempting to minimize the cost of providing the spans; B) given the initial topology of spans identified in step A, finding a set of additional spans that ensures restorability of working demand flows that are required to be restored in case of failure of any span in the initial topology of spans, while attempting to minimize the cost of providing additional spans; and C) starting with the initial topology of spans and the additional spans identified in step B, finding a final topology of spans between nodes in the telecommunications network that attempts to minimize the total cost of the final topology of spans, while routing all working demand flows and ensuring restorability of working demand flows required to be restored in case of failure of any span in the final topology of spans. A network so designed may be implemented in whole or in part.

30 Claims, 7 Drawing Sheets

OTHER PUBLICATIONS

A photocopy of Canadian Patent Application No. 2,210,207, filed Jul. 11, 1997 (published Jan. 11, 1999), including drawings and filing certificate, 93 pages. (Corresponds to A4 listed above).

A photocopy of Canadian Patent Application No. 2,269,649, filed Apr. 22, 1999 (published Oct. 22, 2000), including drawings and filing certificate, 21 pages. (Corresponds to C8 listed below).

A photocopy of Canadian Patent Application No. 2,280,981, filed Aug. 27, 1999 (published Apr. 6, 2000), including drawings and filing certificate, 22 pages. (Corresponds to A5 listed above).

A photocopy of Canadian Patent Application No. 2,285,101, filed Oct. 6, 1999 (published Apr. 8, 2000), including drawings and filing certificate, 38 pages. (Corresponds to C9 listed below).

A photocopy of Canadian Patent Application No. 2,307,520, filed April 28, 2000 (published Oct. 29, 2000), including drawings and filing certificate, 131 pages. (Corresponds to C10 listed below).

A photocopy of U.S. Appl. No. 09/314,518, filed May 19, 1999, including drawings and filing certificate, 21 pages. (Corresponds to C4 listed above).

A photocopy of U.S. Appl. No. 09/414,474, filed Oct. 7, 1999, including drawings and filing certificate, 38 pages. (Corresponds to C6 listed above).

A photocopy of U.S. Appl. No. 09/561,355, filed Apr. 28, 2000, including drawings and filing certificate, 125 pages. (Corresponds to C7 listed above).

A photocopy of Canadian Patent Application No. 2,359,168, filed Oct. 16, 2001, including drawings and filing certificate, 51 pages. (Corresponds to A6 listed above).

"Protection Cycles in Mesh WDM Networks", Ellinas, G, Hailemariam, A. G., Stern, T. E.; *IEEE Journal on Selected Areas in Communications*, vol. 18, No. 10, Oct. 2000.

"MENTOR: an algorithm for mesh network topological optimization and routing", G. Grover, A. Kershenbaum, P. Kermani, *IEEE Transaction on Communications*, vol. 39, p. 503-513, 1991.

"Algorithms for the Spare Capacity Design of Mesh Resorable Networks", B. D. Venables, M.Sc. Thesis, University of Alberta, Edmonton, 1992.

"Optimal capacity placement for path restoration in STM and ATM mesh-survivable networks", R. R. Iraschko, M. H. MacGregor, W. D. Grover, *IEEE/ACM Transactions on Networking*, vol. 6, No. 3, pp. 325-336, Jun. 1998.

"Near optimal spare capacity planning in a mesh restorable network", W. D. Grover, T. D. Bilodeau, B. D. Venables, *IEEE Globecom '91*, pp. 2007-2012, 1991.

"A fast heuristic principle for spare capacity placement in mesh-restorable SONET/SDH transport networks", *Electronics Letters*, vol. 33, No. 3, pp. 195-196, Jan. 30, 1997.

"Two strategies for spare capacity placement in mesh restorable networks", B. D. Venables, W. Grover, M. H. MacGregor, *Proceedings of the IEEE ICC '93*, Geneva, pp. 267-271, May 1993.

"Comparative methods and issues in design of mesh-restorable STM and ATM networks", W.D. Grover, R.R. Iraschko, Y. Zheng, *Telecommunication Network Planning*, pp. 169-200, editors: B. Sanso and P. Soriano, Kluwer Academic Publishers, 1999.

"A self-healing network with an economical spare-channel assignment", H. Sakauchi, Y. Nishimura, S. Hasegawa, *Proc. IEEE Globecom*, (1990) pp. 438-443.

"An optimal spare-capacity assignment model for survivable networks with hop limits," M. Herzberg, and S. Bye, *Proc. IEEE GLOBECOM '94*, pp. 1601-1607, 1994.

"Distributed self-healing network and its optimum spare capacity assignment algorithm", Chujo, T., Komine, H., Miyazaki, K., Ogura, T., Soejima, T.,, *Electronics and Commun. in Japan*, part 1, vol. 74, No. 7, 1991, pp. 1-8.

"A unified approach to network survivability for teletraffic networks: models, algorithms and analysis", D. Medhi, *IEEE Trans. on Communications*, vol. 42, 1994, pp. 534-548.

T. Cinkler, T. Henk, G. Gordos, "Stochastic algorithms for thrifty single-failure-protected networks", in Proc. *Design of Reliable Communication Networks*, Munich, Germany Apr. 2000, pp. 299-303.

Y. Wang, *Modelling and solving single and multiple facility restoration problems*, Ph.D. dissertation, Sloan School of Mangagement, MIT, Jun. 1998., pp. 32-33.

W.D. Grover, "Distributed Restoration of the Transport Network", in *Network Management into the 21st Century*, editors T. Plevyak, S. Aidarous, IEEE / IEE Press co-publication, Chapter 11, pp. 337-417, Feb. 1994.

W.D. Grover, "Self-organizing Broad-band Transport Networks", *Proceedings of the IEEE Special Issue on Communications in the 21st Century*, vol. 85, No. 10, Oct. 1997, pp. 1582-1611.

Y. Xiong; L.G. Mason, "Restoration strategies and spare capacity requirements in self-healing ATM networks" *IEEE/ACM Transactions on Networking*, vol.: 7 Issue: 1, Feb. 1999, pp. 98-110.

J. L. Kennington, M.W. Lewis, The Path Restoration Version of the Spare Capacity Allocation Problem with Modulartiy Restrictions: Models, Algorithms, and an Empirical Analysis, *Technical Report 98-CSE-13*, Department of Computer Science And Engineering, Southern Methodist University, Dallas, Dec. 1998.

Rainer R. Iraschko, "Path Restorable Networks", PhD Thesis, University of Alberta, chapter 4, pp. 56-85, Fall 1996.

M. H. MacGregor, W. D. Grover, "Optimized $k$-shortest-path Algorithm for Facility Restoration", *Software-Practice and Experience*, vol. 24, No. 9, Sep. 1994, pp. 823-834.

I. Saniee, "Optimal Routing Designs in Self-Healing Communications Networks", *Bellcore, MRE 2D-362*, May 1994, 10 pages.

"Introduction to SONET Networking", NORTEL tutorial handbook, Oct. 30, 1996.

R.R. Iraschko, M.H. Mac Gregor, W.D. Grover, "Optimal Capacity Placement for Path Restoration in Mesh Survivable Networks", IEEE, 1996, pp. 1568-1574.

G.N. Brown, W.D. Grover, J.B. Slevinsky, M.H. MacGregor, "Mesh/Arc Networking: An Architecture for Efficient Survivable Self-Healing Networks"IEEE Int'l Conference on Communications, May 1-5, 1994, pp. 471-477.

W.D. Grover, "Network Survivability: A Crucial Issue for the Information Society", IEEE Canadian Review, No. 27, Summer 1997, pp. 16-21.

W.D. Grover, D. Stamatelakis, "Cycle-Oriented Distributed Preconfiguration: Ring-like Speed with Mesh-like Capacity for Self-planning Network Restoration.", Proceedings of IEEE ICC 1998, 7 pages.

* cited by examiner

TOPOLOGICAL DESIGN OF SURVIVABLE MESH-BASED TRANSPORT NETWORKS

CROSS-REFERENCE TO RELATED APPLICATIONS

This application claims the benefit of the filing date of U.S. Provisional Application No. 60/245,189, filed Nov. 3, 2000.

BACKGROUND OF THE INVENTION

Mesh-restorable networks are being widely considered as an alternative to ring-based networks for the coming era of optical networking based on DWDM technology [48]. All references referred to in square brackets are listed at the end of this patent disclosure. A main reason is that mesh restoration requires considerably less redundant capacity than rings to assure 100% restorability against any single failure of an edge in the physical facilities graph [40,41,16,18,1]. The capacity design of meshrestorable networks on a given topology has been subject to much research in recent years. Methods have been developed for working and spare capacity optimization based on span- and path-restoration mechanisms [15,16,17,18,19,25,33,38,54] for Sonet, ATM [24,27,50,51,45] and WDM technologies [21,22,23,31,48]. Refinements have included aspects such as modularity [20], hybridization with rings [53], nodal bypass effects [26], various heuristics and relaxations [42,43,50,46] for the working and/or restoration capacity design problems and self-organizing or other forms of distributed restoration [41,25,49]. In virtually all of the optimization problems so far posed on mesh-restorable networks, however, the graph of the physical facility routes is a given. In practice most facilities-based network operators entered the current era with a legacy topology or a pre-determined topology arising from a prior railway or gas-pipeline utility company right-of-way structure. Traditionally new spans (edges of the facilities graph) would be added on a case-by-case basis, and driven more by the economics of working demand conveyance than from a standpoint of global topology optimization including the sharing of stand-by restoration capacity.

Before about 1985 and the widespread deployment of fiber optics, which was quickly followed by an urgent need for restoration, many long-haul networks were tree-like, optimized to serve the working demands without network-level restoration. Tree-like topologies were viable with digital microwave radio systems because of their high inherent availability. Fiber-based transport relies on cables, however, and experience has shown these to have much lower structural availability that microwave radio. Closed topologies and active restoration schemes have therefore become essential adjuncts to the widespread deployment of fiber optics. By "closed" we mean the graph is either two-connected or bi-connected.

However, unlike the case in private leased-line network design where any desired point-to-point logical edge can be provided for a virtual network, it is generally difficult and very expensive to augment the topology of the underlying physical facilities graph. Consequently the topology of some of today's facilities-based network operators tends to comprise a tree-like pre-1990s topology simply closed (made bi-connected) in the most expeditious manner so fiber rings would be feasible, but not optimized from a global topological standpoint. Other new entrants since deregulation in the U.S. have topologies arising almost wholly from prior utility infrastructures. An important question for all operators is the direction in which they should evolve their physical network topology.

Therefore a natural next step in research on mesh-restorable network design is to bring the physical graph topology into the optimization problem as a variable. The economic attractiveness of mesh restorable networks depends on the extent to which spare capacity is shared for restoration. This has strong dependencies on topology. In what follows, we treat the "green-fields" problem (where no physical edges already exist) but recognize that in practice there would more often be some established set of edges and perhaps only a short list of possible new route acquisitions for incremental topology evolution. The greenfields case lends itself best to overall insights about the problem and has the most generality as the canonical research model. One can easily incorporate any set of pre-existing edges in practical applications.

The computational complexity of solving the complete problem is, however, practically overwhelming for all but small instances. The complete problem includes the simultaneous selection of a set of edges comprising a closed connected graph, the routing and provisioning of capacity for working flows, and the provisioning of restoration routes and spare capacity, so that the network serves all demands and is fully restorable against any single edge failure, at minimum total cost. Here, restoration is assumed to be spanrestoration. Each edge represents a facilities right-of-way on which an essentially unlimited number of capacity augmentations may be installed in the form of additional transmission systems to realize working and spare capacity requirements. A one-time "fixed cost" is incurred for the acquisition and preparation of a new facilities route. There is then a coarse step-wise increase in cost as additional transmission systems are turned up on new fiber pairs, and a secondary step-wise progression on a finer-scale as individual wavelengths or wavebands are turned up within each fiber transmission system. For present purposes we model only one level of step-wise capacity augmentation once an edge is placed. The extension to add the finer-scale cost per wavelength is not difficult but requires additional relative cost parameter assumptions that unnecessarily obscure the emphasis here which is on the basic aspects of combined topology, routing and sparing optimization. Details of the extension and a discussion of cases where its omission is not a significant modelling issue are already given in [20] page 1917. Both fixed and incremental capacity costs are distance-dependent in the general case. For example Level (3), a recent facilities based start-up has acquired ~16,000 miles of right-of-way and installed 12 buried PVC ducts, each holding many fiber optic cables, along each of their facility routes [35]. The fixed charge infrastructure includes an equipment housing every 30 miles for optical amplifiers, etc. Each of the coarse capacity steps represents the lighting up of a new fiber pair with a first block of DWDM carrier wavelengths. The secondary cost step is equipping individual wavelength channels to provision new services as they arise.

We refer to the three main aspects of the problem in brief form as: topology, routing and sparing (the provisioning or spare capacity to support restoration.). The aspects of topology and routing alone constitute a multi-commodity instance of the "fixed charge plus routing" (FCR) problem. This is an NP-hard problem discussed in the next section. But the full problem also involves the influence of topology on the mesh-restorable spare capacity allocation (SCA) or "reserve-network" design problem. This is another NP-hard problem in its own right even when the topology is given. These coupled sub-problems have very different dependencies on graph topology. Solutions of FCR tend towards spanning trees, especially if the edge-to-routing cost ratio is high. This is the natural outcome of serving all the demands with the fewest edges plus routing investment. But the FCR-type topologies are sparse, un-closed and inherently un-restorable by network restoration re-routing. On the other hand, solutions for optimal reserve network capacity design are lower in cost when the network degree is high. And all solution graphs have to be 'closed'. Thus, the overall problem contains counteracting topological preferences that are linked under a min-cost objective for the complete determination of graph topology, working path routing, and restoration capacity placement.

This patent disclosure proposes a three-step heuristic based on various insights about the problem of topological design of telecommunication networks. The heuristic is tested against an implementation of the full problem, solved to optimality where possible, but more often time limited from 6 to 18 hours. The heuristic is shown to run quickly and produce solutions that typically cannot be improved upon by CPLEX running the full formulation for 6 to 18 hours and to be within 8% of optimal in cases where the optimum reference could be solved. The heuristic can also be used to obtain a fairly tight upper bound to help in solving the complete problem.

Some aspects of topological design for communication networks are well developed with classic contributions such as [2] through [8] addressing issues of access network design, expansion planning, wide area packet data networks and backbone network design. There is, however, relatively little work that reflects the specific restoration mechanisms and restoration capacity planning methods associated with Sonet and DWDM optical networking with real-time physical-layer mesh restoration. Some past work on topological design of backbone networks has included bi-connectivity as a requirement on the topology, in recognition of the qualitative robustness this would provide, but with no explicit cost and capacity optimization for active restoration schemes. In contrast, an optical transport network is today required to include an assurance of immediate 100%, restoration of all working wavelengths affected by a cable cut (or optical amplifier failure, etc.). Explicit allocations of spare capacity must be included in the design. The spare capacity of a mesh-restorable network is not dedicated in the way it is in ring-based networks or 1+1 backup restorable networks. The spare capacity in a mesh-restorable network is shared over many failure scenarios, being assembled on-demand into the required restoration paths. The efficiency of this sharing is highly dependent on topology.

A new set of topological design considerations arise in this context. Not only must there be a qualitative robustness through general properties such as bi-connectivity but now the topological design needs also to consider, quantitatively, the ways in which the allocation and sharing of spare capacity for restoration is affected by both the choice of topology and the routing of working flows. Also, unlike network design for data communication or call-trunking applications, there is no graceful degradation effect that can be relied upon for resilience (such as cell loss, blocking, or delay increases) in the face of approximate capacity or routing treatments in the formulation or solution method. In a mesh-restorable network the topology, the routing of working flows, and the spare capacity allocation must provide for complete and exact replacement of each discrete working capacity unit that may fail. Anything less than an exact matching of each failed wavelength with a restoration path created on-demand in the spare capacity means abrupt and total outage for all services borne on the affected wavelengths.

Determining Topology for Routing Working Flows

Much classic work on determining topology pertains to data communication networks, leased line networks, or circuit-switching trunking networks. These problems involve the fundamental trade-off between incremental routing costs and fixed costs for establishment of each edge in the graph and may involve side constraints on average delay or blocking or other performance measures.

One of the first-studied areas of topology optimization was for multi-point line layout. This requires the minimum cost layout of a set of multi-point lines (more generally sub-trees) connecting all nodes to a designated 'central' node. This may include a constraint on the maximum capacity on any branch. Kershenbaum [2] presents this problem and points out that it is NP-complete. The greatest source of complexity ($O(2^N)$ constraints) arises from ensuring that each sub-graph rooted at the central node contains no cycles, (i.e., is a tree). Such cycle-freedom is not a required property in survivable mesh topology determination.

Mesh networks are referred to in some of the literature, for instance Kershenbaum [2], Gavish [6] and Cahn [7], but in their context "mesh" refers only to the departure from tree topologies, admitting solutions that involve partially closed sub-graphs (often called the network backbone). It is recognized by Kershenbaum and in Cahn that a mesh topology gives a network more robustness in a general qualitative way, but there are no formal requirements to assure restorability in the present sense. In those contexts the term mesh refers to networks where there may be more than one possible route between node pairs, as opposed to what we now mean by mesh-restorable networks with general routing over the topology for both working flows and restoration.

Branch exchange is a class of heuristics for such mesh topology optimization [2, p. 306]. The basic branch exchange method begins with a feasible topology and proceeds with local modifications (addition, deletion, or exchange moves) on the graph edges, greedily seeking to maximize some problem-specific figure of merit on each move. For instance, for data communications one may start with a minimal spanning tree and seek new link additions that maximize the ratio of the reduction in average delay to the increase in cost for the link [8]. Note that this implies revision of the routing within the network in the presence of the added link to assess the figure of merit. A related possibility is to start with a full-mesh graph and successively identify links to drop by a figure of merit such as cost per unit flow handled. Re-routing of demands is again implied to evaluate each topology alternative. More generally, as the name suggests, branch exchange algorithms consider simultaneous deletion and addition of edges, equivalent to an exchange. For data communication networks an approach that has worked well is to specify lower and upper limits on delay and, within the allowable ranges, accept any exchange that reduces cost, even if delay increases [9]. Kershenbaum points out that while the basic branch exchange approach is quite general, its main drawback is that the re-routing of demands (to evaluate the benefit at each step) occurs within the inner loop of the process generating the exchanges to test. "Since routing itself is typically $O(N^3)$ this tends to make even simple branch exchange searches O(N5) which is prohibitive for moderate to large size networks"[2].

One idea for improving the performance of branch exchange algorithms is cut-saturation [10]. The idea is that by detecting flow-saturated cuts of the graph, the branch exchange process can be guided to discover effective exchanges in fewer iterations. This is done by generating exchange moves which take a lightly loaded link from one side of the saturated cut and move it to join a node on the other side of the cut, thus moving a lightly utilized capacity investment to increase the cross section of the saturated cut. Heavily used cuts can be efficiently identified with a minimum spanning tree algorithm where link utilizations are used as the edge weights.

MENTOR is a widely used algorithm for data network topology design including aspects of concentrator location [11,2]. MENTOR is highly oriented to the issues of cost-versus-delay in data networking but it embodies some basic ideas of design strategy that may be useful in the restorable-mesh topology problem. First, as noted above, any approach that involves consideration of all $N(N-1)/2$ possible graph edges on N nodes involving a solution to the routing problem that is $O(N^3)$ must be $O(N^5)$ or higher. MENTOR, however, is $O(N^2)$ and yet delivers good data network designs. The key is that MENTOR replaces the actual rerouting of demands with an easily computed surrogate criterion based on postulated hallmarks of a good routing solution. This allows MENTOR to skip a lot of the details in its basic iterations and look instead for general characteristics that are desirable from basic network design principles. This philosophy is also found in the more recent Zoom-In algorithm described below in paragraphs 042 and 043.

A different, quite elegant approach to determining a min-cost network topology (and implicitly, the related routing) in networks where cost depends only on the edges used and the flow on each edge (i.e., there are no restorability considerations) is to let an economy-of-scale effect implicitly attract flows to certain routes and edges, so as to minimize total cost while determining topology at the same time. This is the work of Yaged [12] based on fixed-point iteration systems. Let $cm=fm(ym)$ be a cost function which gives the total cost of capacity on edge m if a flow of ym crosses the edge. The function $fm(ym)$ can have any shape as long as it is continuous, with positive-only values of the function and its first derivative, and has a second derivative that is strictly negative. These conditions stipulate a type of cost-function that bends over or flattens continually as the independent variable (flow on the edge) rises. Although it is a continuous cost model, a function of this type can be fitted to approximate an actual fixed charge plus incremental routing cost characteristic also reflecting the nonlinear economy of scale that arises in real systems. The optimization problem is then:

$$\min \sum_{m \in A} f_m(y_m) \quad (1)$$

where A is the set of all possible edges in the network graph. Yaged [12] has shown that under the stated conditions for $fm(ym)$ there is a fixed-point solution to the flows and costs on each edge corresponding to an optimal solution to Obj. (1). This means that if we start with a set of flows where all demands are individually "least cost" routed and iterate the process: {routing→flows→costs→routing . . . }, then this process converges to a cost-optimal set of routes, flows, and edge choices (some edges will eventually support no flows). It is because of the concave nature of the cost function (cost per unit capacity decreases as total capacity rises) that such a fixed-point solution exists. The final network will consist of a minimal number of maximal capacity spans that serve the full demand matrix.

The problem of topology determination for min-cost of edge selections plus routing costs has also been studied in the O.R. community as the "fixed charge plus routing" (FCR) problem. The network version is usually a multicommodity problem where every origin-destination (O-D) pair may exchange non-zero demands. In its capacitated version it may have existing edge capacities and/or edge capacity limits to be respected. We build upon FCR in the present work and so we cover it now in some detail. With the following definitions, the basic fixed charge plus routing problem can be stated as:

N is the number of nodes, N is the set of such nodes.

A is the set of $(N(N-1)/2)$ possible (bi-directional) edges in the graph on the set of nodes N.

D is the set of all non-zero demand quantities exchanged between nodes, indexed by r.

$d^r$ is the amount of demand associated with the rth demand pair in D. Demands are treated as being unidirectional but the unidirectional solution information implies the bi-directional capacity design corresponding to a real transport network.

O[r] is the node that is the origin for the rth demand pair in D. T[r] is the corresponding target or destination node.

cij (=cji) is the incremental cost of adding one unit of capacity to edge (i,j).

Fij is the fixed cost for establishment of an edge in the graph (directionally) from node i to node j. (The full fixed charge for the bidirectional edge is effected through asserting symmetry of the edge decision variables below).

$w^r_{ij}$ is the amount of working flow routed over the edge between nodes (i,j) in the direction from i to j for relation r.

$w^{ij}$ is the working capacity assigned to the edge between nodes (i,j) to support all working flows routed over that edge in the (i,j) direction.

$\delta_{ij}=\delta_{ji}$ is the 1/0 decision variable indicating whether an edge in the graph is to exist between nodes (i, j) in the design. Equals 1 if edge is selected, zero otherwise.

K is an arbitrary but large positive constant, larger than any expected accumulation of working capacity on any one edge in the solution.

FCR:

$$\min \sum_{ij \in A} \{c_{ij} \cdot w_{ij} + F_{ij} \cdot \delta_{ij}\} \quad (2)$$

$$\sum_{nj \in A} w^r_{nj} = d^r \quad \forall r \in D; n = O[r] \quad (3)$$

$$\sum_{jn \in A} w^r_{jn} = d^r \quad \forall r \in D; n = T[r] \quad (4)$$

$$\sum_{in \in A} w^r_{in} - \sum_{nj \in A} w^r_{nj} = 0 \quad \forall r \in D; \forall_n \notin \{O[r], T[r]\} \quad (5)$$

$$w_{ij} = \sum_{r \in D} w^r_{ij} \quad \forall ij \in A \quad (6)$$

$$w_{ij} \le K \cdot \delta_{ij}; \delta_{ij} = \delta_{ji}; \delta_{ij} \in \{0, 1\}; w_{ij} \text{ integer } \forall ij \in A \quad (7)$$

Candidate edges for the topology are indexed by node-name pair from the set A. An edge (i→j) is selected into the topology if $\delta_{ij}$ is one, in which case the 'fixed charge' for the associated edge Fij is contributed to the objective function. Constraints (3), (4) and (5) are the familiar flow-balance constraints of the node-arc transportation problem. They assert, for each demand pair, that total source flow equals the demand, that the total sink flow also equals the demand, and that no net sourcing or sinking of flow for the given O-D pair occurs at any other node (i.e., "trans-shipment"). The node-arc (or "pure flow") treatment for this problem (as opposed to arc-path) avoids the need to provide an exponential number of explicit route representations. As presented, Constraints (6) are really only the definition of required edge capacity in terms of the simultaneous flows over the edge. As an alternative the cost for these capacities can be referred into the objective function with an additional summation over all demands. The approach above, however, lets us assert integrality on the edge capacities and provides the capacities as explicit output variables. Other versions of the problem may involve a family of capacity units without there being a dominant 'get started' edge cost and smaller subsequent capacity unit step. For instance this would be the more common paradigm for private leased-line network design. Each leasedline STS3, 12 or 48 acquired would have a one-time establishment cost but without a subsequent smaller cost step being enabled on the same logical route. There is thus the aspect of fixed charge for every capacity acquisition, rather than fixed charge for edge selection which then lowers the cost of capacity on that edge. With both the latter considerations brought to bear, the objective function becomes $$\min \sum_{r \in D} \sum_{ij \in A} c_{ij} \cdot w_{ij} + \sum_{l \in L} \sum_{ij \in A} F^l_{ij} \cdot n^l_{ij}$$

where L is a family of transmission capacity options or leased line services each with a corresponding fixed cost and capacity.

For our problem we will model one fixed-charge step associated with acquiring the right-of-way on which the fiber facility route is established (the "edge cost"), followed by any number of integral capacity additions on the edge, representing the establishment of each new DWDM transmission system. An "edge-to-unit capacity" cost parameter, $\Omega$, will represent this ratio on a unit-distance basis. In practice, capacity on an edge may also have a secondary growth structure in steps associated with equipping individual new channels on a DWDM transmission system. For present purposes we avoid this extra dimensionality in the presentation and results. The approximation is minor in terms of the basic effects involved. A single capacity step can be interpreted as representing either a per-channel average step cost that includes pro-ration of the larger per-system cost step, or conversely that each integral step corresponds to a system addition at an assumed average fill level of per-channel steps, or simply that each system is fully channel-equipped when placed [20].

The FCR problem may be generalized to include pre-existing edges or already installed capacity on some edges. As for the MTRS problem, this may be the most common situation in practice. It is easy to add such specific considerations to either FCR or MTRS either by representing existing edges as having zero edge cost, or with an added equality constraint that directly asserts the respective edge decision variable in the solution.

Gendron et al. [13] provide a survey of various formulations and solution approaches for capacitated multicommodity FCR problems and include their own work on relaxations for the problem. Cruz et al. [14] have also recently treated the uncapacitated problem, with an emphasis on solving it to optimality through a new criterion for use in the branch and bound search. The version of FCR that becomes a constituent part of our problem is capacitated, not in the sense that we will assert pre-existing capacities or limits, but in the aspect that capacity on edges will be integral. As a consequence there are "mutual capacity" constraints (constraints (6) above) governing the composite routing solution under the discrete capacity on each edge in the design. Gendron [13] points out that it is these mutual capacity constraints that make the capacitated versions of FCR "NP-hard and very difficult to solve in practice". Lagrangean relaxations defined by dualization of various sets of constraints are also presented in [13]. The solution gaps vary somewhat unpredictably, however, up to 40%, over the five relaxation strategies tested and were rarely better than a TabuSearch heuristic for the same problems. This is not a criticism, it simply affirms the computational difficulty of capacitated multicommodity FCR problems and even of getting good bounds for the problem.

One of the difficulties in applying branch and bound to solve FCR problems is that the "strong relaxation" (dropping all integrality constraints, including on the edge variables) gives very weak lower bounds. This is because the mutual capacity constraints are so crucial to determining an optimal FCR solution. In the un-relaxed FCR problem, the choice of routes for each working flow is strongly coordinated with that of other flows, so as to use as few edges and capacity units as is optimal. We will later see that this is abundantly true of the MTRS problem as well. MTRS inherits this aspect of FCR and adds to it similar aspects of sharing spare capacity for restoration, which are intimately dependent on the graph topology. Under the relaxation each flow is more or less independently routed since there is no shared-efficiency effect from the fixed charge component. In other words the solution space to an FCR (or MTRS) problem is strongly and discretely structured by the topology variables. If completely relaxes edge decision variables, then a form of amorphous uncoupled sea of flows is represented with total costs that are almost completely unrelated to the real problem on a discrete graph. This is why relaxation of the 1/0 edge decision variables gives an almost meaningless and extremely loose lower bound.

Gendron [13] also mentions adding a constraint to FCR to the effect that (with no pre-existing edges) the solution must contain at least N−1 edges to have a connected network. We make use of this principle as well but to assert advance knowledge that any feasible graph must be closed and, optionally, to incorporate an a priori expectation that the cost-optimal solutions lie in practice with solution graphs of limited maximum nodal degree. In other words, there is some upper level of connectivity that is not plausible.

In summary, there is a considerable body of literature, methods and software available to solve FCR problems. This is desirable and relevant to the present work because the approximate solution method to follow effectively reduces the full problem of topology, routing and survivability to a special instance of classical FCR plus two other new, but easier to solve sub-problems.

The other area of relevant prior work is on the problem of "reserve network" design or minimum cost spare capacity assignment to support a target level of restoration through re-routing over the surviving spare capacity of the network after failure. The need for 100% restoration of fiber-optic networks is a relatively new imperative that is an expectation of Sonet and DWDM networks. Transmission capacity that is designed into a fiber optic transport network solely for such restoration purposes is variously called restoration, protection, reserve or spare capacity. We will use the generic term spare capacity.

There are two main classes of mesh-restorable network. One is based on restoration wherein demands that are normally routed over a failed span are re-routed over a multiplicity of distinct restoration paths formed between the immediate end-nodes of the fault. In transmission engineering, a span refers to the set of all transmission systems in parallel between adjacent nodes at which working and spare capacity units can be manipulated for routing or restoration purposes [47]. The most common failure model, a "span cut", is assumed to fail all the transmission capacity (working and spare) on one edge of the graph. We use "span" for references to the physical transmission infrastructure entity, but "edge" when referring to an element of the fiber-route facilities graph. Such paths are formed out of the surviving spare capacity on spans excluding the failure span. The restoration paths each replace one unit of working capacity on the failed span and may take different routes. Demands remain on their previous routes on either side of the failure. Demands that were not directly affected by the fault are not rearranged or pre-empted in anyway. Span restoration thus provides a logical detour comprised of a set of replacement path segments around the break, without knowledge or consideration for the ultimate origin-destination (O-D) nodes of each working path being restored. Span restoration is also called "link" restoration in different sources.

In path restoration demands that are severed by a failed span are simultaneously re-routed end-to-end between their original O-D nodes within the surviving network. Path restoration is more capacity-efficient [19,50] but also considerably more complex in terms of the capacity design and real-time implementation problems [52]. Our present scope is focused on topology design for span-restorable mesh networks.

The spare capacity design problem for span restoration is a form of non-simultaneous single-commodity capacity allocation problem to dimension the reserve network that is overlaid on the same topology as the working flows. Soriano et al. provide a survey [15] tracing the history of O.R. work on non-simultaneous multi-terminal flows. Much early work that bears on this problem was to support time-varying network flow patterns (multi-hour engineering). The main logical difference in the restoration context is that one edge of the graph is deleted for each of the failure-induced non-simultaneous flow requirements.

More recent work specifically for Sonet/DWDM mesh restoration began about 1990. Sakauchi et al.[16] proposed a linear programming representation of the spare capacity allocation problem for span restoration based on min-cut max-flow considerations. In this model the spare capacity assignment is made so that the minimum spare-capacity cut that governs total restoration flow for each failure is dimensioned adequately for the required restoration level. A technical challenge with this approach is that the number of cutsets in a network is $O(2^S)$, so the computational problem is to find a suitably small set of cut-sets that fully constrains the solution while also permitting an optimal capacity design. The approach is therefore to use a constraint-generation technique in which successive solutions of an LP detect and add missing constraints in the tableau. Missing relevant constraints are discovered by testing the resultant design at each stage for restorability on each span with a separate restoration routing program. The final relaxed spare capacity values are rounded up either at the end, or at each iteration, to obtain an integer and/or modular solution. This basic approach was studied further and enhanced by Venables et al. [17,44] with an efficient algorithm for discovering relevant new cuts and a "path table" data structure that allows for very fast testing of restorability.

Herzberg and Bye [18] proposed an arc-path LP formulation in which the graph topology is first processed to find all the distinct logical routes that are "eligible" for use in the restoration for each failure scenario. To reduce the problem size, hop limits restrict the length of eligible routes. Spare capacity values are sized to support the largest assignment of simultaneous restoration flows to the eligible restoration routes on each edge, over all non-simultaneous failure scenarios, so that a minimum total of spare capacity supports all restoration flow combinations. In [18] rounding and adjustment approximate the optimal integer solution but in practice this problem can often be solved directly as a Integer Program for reasonably large sizes. In one sense the complexity of the basic arc-path approach is as great as the cut-oriented formulation because the number of distinct routes is also $O(2^S)$. In practice, however, it is easier to reduce the arc-path problem size by reducing the number of eligible routes with no loss of solution quality if all distinct routes up to a threshold hop-limit are represented [18]. The arc-path approach also gives a detailed specification of the restoration routes and flows, while the cut-set approach implicitly assumes only that a max-flow equivalent restoration routing is achieved. A desirable practical advantage of the arc-path method is that restoration route properties can also be under direct engineering or jurisdictional control for any property such as length, loss, hops, or any other eligibility criteria for each failure scenario, while the cut-flow approach does not facilitate this kind of arbitrary user control of the restoration routes in design. It should be noted in passing that the basic arc-flow transportation-like problem structure that we necessarily adopt in MTRS similarly does not offer such explicit control over the restoration routes.

In the above works ([16,17,18] and others) the demands are first routed (usually through shortest path routing), and then the spare capacity is optimized to restore the resultant working capacities. A jointly optimized working path routing and spare capacity placement solution was developed by Iraschko et al. in [19] in the form of a mixed integer program (MIP) for either span or path restoration. The aspect of jointness allows working paths to be routed in other than a shortest path manner so that, in conjunction with the spare capacity needed for restoration, the total (working plus spare) capacity requirement is minimized. Joint optimization of working path routing with spare capacity placement for restoration is an implicit part of the complete topology, routing and restoration problem that we address. The work in [19] also somewhat justifies the interest in span restoration because it was found that a jointly optimized span-restorable mesh is typically almost as capacity-efficient as a path restorable network. This is significant because realtime span restoration is considerably simpler than path restoration from an engineering standpoint and would be the preferred technology if the capacity penalty relative to path restoration is not large.

Based on the above work, we present a summary of the problem of spare capacity design for span restoration, as it will be incorporated into the problem involving topology.

Where the topology is already given, an arc-path formulation for the basic (non-joint) spare capacity allocation (SCA) problem is:

SCA:

$$\min \sum_{i \in S} c_i \cdot s_i \qquad (8)$$

$$s.t. \sum_{p \in P_i} f_{i,p} = w_i \quad \forall i \in S \qquad (9)$$

$$s_j - \sum_{p \in P_i} \delta^p_{i,j} \cdot f_{i,p} \geq 0 \quad \forall i, j \in S, i \neq j \qquad (10)$$

$$f_{i,p} \geq 0 \quad \forall i \in S \; \forall p \in P_i \qquad (11)$$

Here, the indexing is on the spans. As a general convention, i corresponds to a failure span and j designates other, surviving, spans in that failure scenario. $P_i$ is the set of all distinct eligible routes that may be used for restoration of failure i. When the graph topology is given, the sets P, are easily found up to a practical hop or length limit by a depth-first search, to generate the problem tableau. The eligible routes to which restoration flow may be assigned are encoded by the $\delta^p_{i,j} \in \{0, 1\}$ parameters. $\delta^p_{i,j}$ is 1 if the $p^{th}$ route available for restoration of failure i includes span j, and 0 otherwise. $f_{i,p}$ is the restoration flow assigned to the $p^{th}$ route available for restoration of failure i. The $s_i$ values are the desired spare capacity assignment and the $w_i$ are input parameters giving the total working capacity to be protected on each span arising from the prior routing of demands. To correspond to a DWDM mesh-survivable network, $s_i$ and $w_i$ are both numbers of wavelengths and, therefore, strictly integral. In our complete model for topology design, we will keep these capacity quantities integral while relaxing the underlying flow variables.

In (10) each $s_i$ quantity is determined by the largest sum of simultaneously imposed restoration flows over that span, over the set of all non-simultaneous failure scenarios not involving that span itself as a failed element. Thus, the spare capacity assignment to each span j, arises from a different finite-flow sub problem, i.e., that for some other span i, which happens to require the largest restoration flow over j. Each individual failure scenario, taken in isolation, is similar to a two-terminal min cost network flow problem. But an optimal SCA solution need not employ the min cost flow assignments from any of these sub-problems individually because all are coupled together under the global objective of minimum sparing. The result is a minimum sum of span-wise maximum quantities of the restoration flow on each span. Related to this is the reason that constraints (10) are not equalities. The feasible flow for restoration of a span i may exceed its requirement, even in an optimal design, as a side-effect of the higher flow requirements asserted by other failure scenarios. Although the formulation has a transportation-flow like structure in its subproblems (as just explained) the problem is not unimodular. If solved as an LP one can use the procedure in [18] to "round up", then "tighten" the spare capacity variables to an integer-optimal solution. The model has $S^2$ constraints (S from (9) plus S(S−1) from (10)) and S+Σ|$P_i$| variables.

To effect joint optimization, the prior $w_i$ inputs become variables and add constraints to ensure the routing of working demands and adequate working capacity to support these simultaneous flows. The added constraints for the joint problem are:

$$\sum_{q \in Q^r} g^{r,q} = d^r \quad \forall r \in D \qquad (12)$$

$$w_j - \sum_{r \in D} \sum_{q \in Q^r} \zeta^{r,q}_j \cdot g^{r,q} = 0 \quad \forall j \in S \qquad (13)$$

where $Q^r$ is the set of routes eligible for working path routing for relation r, $g^{r,q}$ is the amount of working flow assigned to the qth eligible route for relation r, and $\zeta^{r,q}_j$ is an input parameter that is 1 if the qth eligible route for relation r crosses span j.

Modularity (meaning a family of modular capacity sizes from which to choose) can be added to either the joint or non-joint problems by changing the objective function to become the cost weighted sum of transmission modules selected for each span, i.e:

$$\min \left\{ \sum_{m \in M} \sum_{j \in S} c^m_j \cdot n^m_j \right\} \qquad (14)$$

and adding a constraint that relates the logical working flows and spare capacities to the actual increments of modular capacity that are available:

$$s_j + w_j \leq \sum_{m \in M} n^m_j \cdot z^m \quad \forall i \in S. \qquad (15)$$

In the above, M is a set of module types, indexed by m, each with an associated capacity $z^m$. $cj^m$ represents the cost of placement of a module of type m on span j which may depend on the length or type of facility route upon which span j is based. $n_j^m$ is the number of type m modules to install on each span j. Modularity aspects can be easily incorporated into the MTRS problem (and may even aid in its solution by constraining the feasible capacity values) but in our analysis we stay with integer non-modular capacity solutions to forego the specificity and restriction that assumptions of a particular family of modularities might have on our results and their interpretation.

Other work on variations of the problem of mesh-restorable capacity design, all with the topology given include [21–27]. Contributions by Medhi [28, 29] also consider restoration of circuit-switched services from a unified approach involving both transport layer and circuit-layer dynamic routing strategies. Pioro and Szczesniak [30] apply a dual Benders decomposition method to solve some related multi-layer formulations. The multi-layer aspect arises in a context where a certain allocation of spare capacity is first reconfigured in the transport layer, then a second reservation of spare capacity (more finely adaptable) is reconfigured at the services layer. The physical layer topology is again given and fixed.

Also in [31, 32, 36], the topology of a survivable network is explicitly considered. These approaches involve a Genetic Algorithm or other stochastic change heuristic to generate a search through topology space with a solution to the routing and sparing problem following as a way to evaluate each topological candidate. The basic merit of an algorithmic search approach to topology is largely confirmed by the computational behaviour of the full MTRS problem in what follows. In the full problem (not in the proposed heuristic) we see the MIP solver having great difficulty with basic feasibility, which we attributable to graph construction considerations. An algorithm can inherently constrain its search to a succession of closed connected (i.e., feasible) graphs, whereas an IP solver's search domain is edge selection space (not directly graph space) with the impediment that the vast majority of edge selection vectors do not even describe a feasible graph for the MTRS problem. In this light the proposed heuristic is an alternative to algorithmic search in addressing the same issue. Only it does so by almost direct construction of a single high-quality solution graph.

In Cinkler et al [32] topology is explored in a simulated annealing-like technique of iterative randomized routing, capacity allocation, and edge deletion trials. In [31] Pickavet and Demeester consider an integrated multi-period planning approach based on a Genetic Algorithm to generate several topological alternatives for each period followed by shortest path techniques to deduce which sequence of topologies offers a least cost network expansion plan over all time periods. The basic method in [31] appears to have been the Zoom-In method, recently described in depth in [36].

Coincident with preparation of this paper, work by Pickavet and Demeester [36] appeared which addresses the same overall problem. Interesting ideas are presented for treating the sub-problems of topology, routing and sparing with surrogate problem abstractions and heuristics, followed by a exact optimization of routing and sparing on a fixed topology only when a final best topology is to be evaluated in detail. The Zoom-In approach uses a fast surrogate to approximate the sub-problems of demand routing and spare capacity assignment. Using a simple and fast surrogate for these sub-problems is evocative of the MENTOR philosophy and allows more topology options to be examined in the global search. The surrogate problem is to generate the capacity cost that corresponds to the 'bi-routing' of each demand where the demand matrix is first scaled up by a factor (1.2 empirically suggested) and half of each demand bundle is routed over the shortest path, the other half over the shortest path that is link-disjoint from the first. The resulting total capacity is a representative upper bound on the cost of a detailed solution to working capacity and sparing problem. With this process to evaluate the "fitness" of a proposed topology, a Genetic Algorithm (GA) is used to explore topology alternatives, with the surrogate problem being solved to represent the routing and sparing cost of the given topology in evaluating its fitness function. Once the GA on topology is completed, a detailed local optimization of the routing and sparing follows, completing the Zoom-In design.

The heuristics from the Zoom-In approach are complimentary to but different from the ideas and approach that is described in this patent document. Zoom-In is based on algorithmic search on topology and a suite of sub-tools that may or may not all be used on a given problem or at a given stage in its refinement. These are strengths for application in network planning software. In contrast, the heuristic proposed here is more dependent on the underlying structure of the MTRS problem and attempts to use MIP type solution tools throughout to find a high quality design without explicit algorithmic search. Our aspiration is to provide a hopefully insightful, but relatively specific tactic for decomposition of the topology, routing, and sparing problems. To the extent that the following heuristic captures a valid insight about the assembly of a "good" topology for MTRS, it may be seen as an additional tactic to propose topology within a larger search strategy. It seems likely that there are ways in which elements of the basic Zoom-In approach and the present method could be combined in future work.

SUMMARY OF THE INVENTION

Accordingly, there is in one aspect of the invention proposed a method of designing a telecommunications network, the method comprising the steps of:

A) for all working demand flows required to be routed in the telecommunications network, finding an initial topology of spans between nodes in the telecommunications network that is sufficient for routing all working demand flows, while attempting to minimize the cost of providing the spans;

B) given the initial topology of spans identified in step A, finding a set of additional spans that ensures restorability of working demand flows that are required to be restored in case of failure of any span in the initial topology of spans, while attempting to minimize the cost of providing additional spans; and C) starting with the initial topology of spans and the additional spans identified in step B, finding a final topology of spans between nodes in the telecommunications network that attempts to minimize the total cost of the final topology of spans, while routing all working demand flows and ensuring restorability of working demand flows required to be restored in case of failure of any span in the final topology of spans.

According to a further aspect of the invention, the final topology of spans may be subject to a constraint limiting the average nodal degree of the final topology of spans, or the hop length of any restoration path. In addition, the working demand flows that are required to be restored may be all working demand flows required to be routed in step A, or may be restricted to premium services. It is preferred that steps A, B and C are each an iterative process, and a sifter is applied at each iteration to remove unreasonable solutions for the respective step. The final topology of spans may be subject to a constraint limiting the connectedness of the final topology of spans, which may be bi-connected or two-connected. Preferably, the steps A, B and C an integer programming formulation.

The final topology of spans may then be implemented, which may be an implementation of a network from the beginning, in which all spans are built, or it may be an implementation in which an existing network is modified by addition of spans.

BRIEF DESCRIPTION OF THE FIGURES

There will now be described preferred embodiments of the invention, with reference to the drawings by way of illustration only, in which;

FIGS. 3A–3D are topologies from Round 1 Case 4: 9n36s4-15 for each heuristic step and an optimal MTRS solution, in which FIG. 3A is the topology for end of Step W1 (9 edges), FIG. 3b is the topology for end of Step S2

(new edges only)—three edges added, FIG. 3c is the topology for Step J3 (12 edges) after 5.2 minutes, Obj=20 560 and FIG. 3D is the topology for end of MTRS (optimal) (15 edges) 73 hours, Obj=19 094;

FIGS. 4A–4D are topologies from Round 1 Case 6: 10n45s2-15, in which FIG. 4A is the topology for end of Step W1 (12 edges), FIG. 4B is the topology for end of Step S2 (two new edges), FIG. 4C is the topology for Step J3 (14 edges) after 27.3 minutes, Obj=23 300 and FIG. 4D is the topology for end of MTRS (sub-optimal) (23 edges) after 6 hours, Obj=23 471.

FIGS. 5A–5D are topologies from Round 1 Case 7: 10n45s3, in which FIG. 5A shows the topology for end of Step W1 (10 edges), FIG. 5B shows the topology for end of Step S2 (6 new edges and three edges from Step W1 that received zero spare capacity), FIG. 5C shows the topology for Step J3 (16 edges) after 33.5 min, Obj=21 160 and FIG. 5D shows the topology for end of MTRS (sub-optimal—24 edges) after 6 hours, Obj=26 416; FIG. 6B shows the topology for end of Step S2 (5 new edges and one disused edge from Step W1), FIG. 6C shows the topology for Step J3 (21 edges) after 19.2 min, Obj=22 225 and FIG. 6D shows the topology for end of step MTRS (sub-optimal) (26 edges) after 12 hours, Obj=25 248.

DETAILED DESCRIPTION OF PREFERRED EMBODIMENTS

Figure 1:
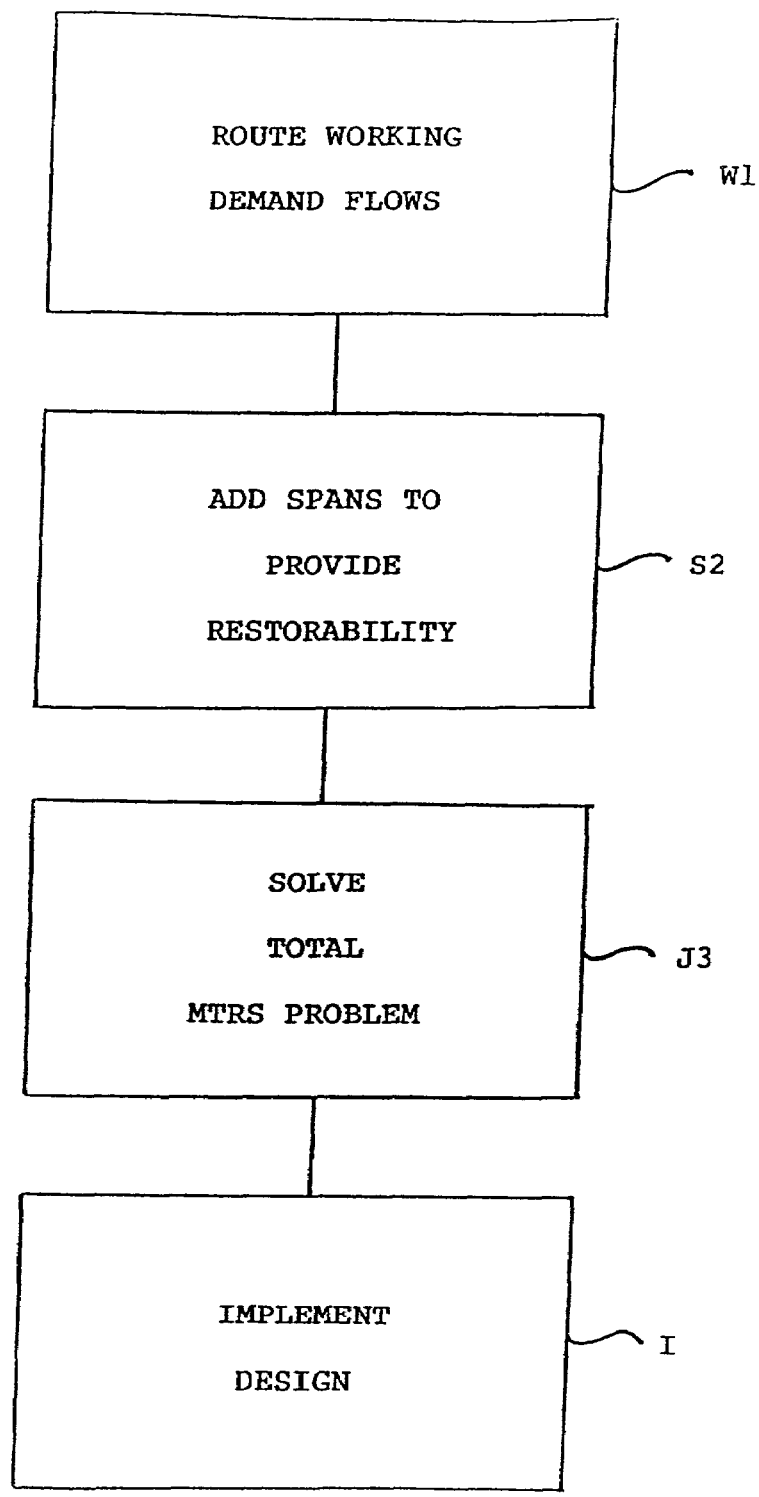
FIG. 1 is a flow diagram showing the basic method steps of the invention.

The word comprising used in the claims is used in its inclusive sense and does not exclude other elements or method steps being present. Likewise, the use of the indefinite article "a" before a noun does not exclude more than one of the element being present. MTRS is an acronym for master formulation for optimization of topology, working routes and restoration spare capacity.

In this section we set up a 1/0 IP formulation of the complete MTRS problem. In the basic model all N(N−1) directional edge candidates are modelled but if either direction is chosen, its reverse direction is also asserted. There are no length or hop limits on the routing of working or restoration paths, but the model is specifically based on span-restoration as defined above and the set of failure scenarios consists of all single span failures. While the arc-path formulation is efficacious and convenient for the standalone SCA problem, we have to abandon the arc-path method altogether in favour of a node-arc formulation to cope with the topology becoming part of the solution variables. This, and the relaxation of flow variables, is explained further after looking at the formulation. We use the sets, variables and parameters so far defined to which we add:

$s^{kl}_{ij}$ is the amount of restoration flow routed over the edge between nodes (k,l) in the direction from k to l for restoration of failed edge (i,j).

$s_{ij}$ is the spare capacity assigned to the edge between nodes (i,j) to support the largest combination of simultaneously imposed restoration flow requirements over that edge in the (i,j) direction.

The complete formulation, denoted MTRS for "mesh topology, routing and sparing", is cast as follows:

MTRS:

$$\min \sum_{ij \in A} \{c_{ij} \cdot (w_{ij} + s_{ij}) + F_{ij} \cdot \delta_{ij}\} \quad (16)$$

$$\sum_{nj \in A} w^r_{nj} = d^r \quad \forall r \in D; n = O[r] \quad (17)$$

$$\sum_{jn \in A} w^r_{jn} = d^r \quad \forall r \in D; n = T[r] \quad (18)$$

$$\sum_{in \in A} w^r_{in} - \sum_{nj \in A} w^r_{nj} = 0 \quad \forall r \in D; \forall n \notin \{O[r], T[r]\} \quad (19)$$

$$w_{ij} = \sum_{r \in D} w^r_{ij} \quad \forall ij \in A \quad (20)$$

$$\sum_{ik \in A; j \neq k} s^{ik}_{ij} = w_{ij} \quad \forall ij \in A \quad (21)$$

$$\sum_{kj \in A; i \neq k} s^{kj}_{ij} = w_{ij} \quad \forall ij \in A \quad (22)$$

$$\sum_{nk \in A; k \notin \{i,j\}} s^{nk}_{ij} - \sum_{kn \in A; k \notin \{i,j\}} s^{kn}_{ij} = 0 \quad \forall ij \in A; \forall n \notin \{i, j\} \quad (23)$$

$$s_{kl} \geq s^{kl}_{ij}; s_{kl} \geq s^{kl}_{ji} \quad \forall (ij), (kl) \in A^2; (ij) \neq (kl) \quad (24)$$

$$w_{ij} + s_{ij} \leq K \cdot \delta_{ij}; \delta_{ij} = \delta_{ji}; \delta_{ij} \in \{0, 1\}; w_{ij}, s_{ij} \text{ integer}, \forall ij \in A \quad (25)$$

to which we add the following side constraints ("added valid knowledge" constraints) to help in solution:

$$\sum_{ij \in A} \delta_{ij} \geq N \quad (26)$$

$$\sum_{k \in N; i \neq k} \delta_{ik} \geq 2; \quad \forall i \in N \quad (27)$$

and, optionally:

$$\sum_{ij \in A} \delta_{ij} \leq d_{\max} \cdot N / 2 \quad (26b)$$

where $d_{max}$ is some empirical upper limit on the maximum average nodal degree of expected or admissible topologies. We now discuss the overall structure of the model and the role of individual constraint systems.

Problem Structure

First, the problem is cast in a node-arc flow manner which is a significant departure from the prior work on restorable network capacity design. When the topology has been defined ahead of time, an arcpath approach is often preferred because it allows explicit control and direct observability of the working and restoration routes employed in the solution. If needed, it also allows a trade-off between solution quality and run times through strategies which control or ration the total number of eligible routes represented for working and restoration flow assignment in such problems.

However, when the graph topology is itself admitted as a solution variable, the setting up of data files for an arc-path formulation becomes untenable: a master set of eligible routes would have to be developed for representation (in the AMPL DAT file) that is structured in some way so that, for each combination of edges selected, it is evident which routes, amongst all possible on the full-mesh graph, are "enabled" under the specific set of non-zero edge variables. It is as though every plausible topology would have to be identified ahead of time and a set of eligible working and restoration routes determined and stored for each topology instance. Hence we are virtually forced to use a transportation like flow representation of the working path routing and restoration flow solutions because of its self-contained nature.

There are two places where the transportation-like problem structure is evident. In constraints (17)–(19) there is a simultaneous multi-commodity transportation-like structure dealing with the normal routing of working flows. For each O-D pair there is a "source node" and corresponding "sink node" constraint followed by assertion of trans-shipment constraints at nodes that are neither source nor sink for a particular demand. The need to express the concept of trans-shipment at other nodes (net incoming flow=net outgoing flow for a given commodity) is ultimately why the whole formulation (capacities, flows, and edge selection variables) is forced into a unidirectional framework (which is then mapped into the corresponding bi-directional capacity allocations for a fiber optic transport network). Constraints (20) generate the (directional) working capacity assignments on each edge so as to simultaneously support the required working flow variables on each edge, for each demand pair.

The second transportation-like structure appears in (21)–(23). This is a set of non-simultaneous single-commodity flow sub-problems, each describing the corresponding source, sink and trans-shipment constraints pertaining to the restoration flows for one particular edge failure. (24) is the corresponding spare capacity generating constraint. As in standalone SCA, it is an inequality because the requirement is to force the spare capacity on each edge to satisfy the largest of the non-simultaneous restoration flows imposed on the given edge. Finally (25) deals with the edge selection variables that define the topology on which the above routing and restoration solutions are jointly coordinated to minimize total cost.

Added Valid Knowledge Constraints

The additional constraints (26), (27) and (26b) are not logically required parts of the problem, but can speed up the branch and bound solution times by expressing topological properties that have to exist in any connected network that satisfies the restorability constraints in (21)–(23). First, (26) is a single global constraint that the topology must contain at least as many edges as there are nodes for the network to be two-connected. The corresponding solution is a Hamiltonian ring—which, interestingly, does emerge in test cases when a Hamiltonian exists and fixed charges are much higher that the incremental routing costs. Secondly (27) says that in addition each node must individually be of at least degree two. Corresponding additional constraints can be applied to FCR as well. In correspondence to (26), FCR would have:

$$\sum_{ij \in A} \delta_{ij} \geq N - 1.$$

The corresponding individual node constraint is weaker: in FCR it is only possible to assert that every node has at least one selected edge incident on it for FCR, i.e.).

$$\sum_{k \in N; i \neq k} \delta_{ik} \geq 1; \forall i \in N.$$

Whereas (26) and (27) may or may not be applied, they are certainly mathematical truths. On the other hand, (26b) is a "belief-based" optional constraint. A constraint of the form (26b) represents the a priori knowledge that (for instance) no known transport network has an average nodal degree higher than five. In other words, if we put credence in the merit of real transport graphs for their intended purposes, we can derive a guideline on the maximum number of edges an optimal design could plausibly contain. In practice we do believe that with current technologies and costs, optimal graphs lie somewhere in the range $2<d<d_{max}$ with $d_{max}<5$ (which is where all published examples of transport networks exist). Of course in a purely general instance of MTRS as a mathematical problem only, it would not be known a priori what $d_{max}$ brackets the optimum and this would not be advisable. But in problems where the costs of edges and capacities are derived from real circumstances, it may be quite reasonable and useful and to apply something like $d_{max}<6$ (or certainly $d_{max}<8$) to restrict the solution space without affecting optimality.

Relaxations

The edge selection variables are naturally 1/0 and fundamental to the mutual capacity and edge-cost sharing issues in a real design so we do not relax them (except in later lower bounding trials). We also keep the working and spare capacity variables integral (but non-modular) but relax the underlying working and restoration flow variables. A useful property inherited from SCA is that if integrality is asserted on the $s_i$ and $w_i$ capacities, the restoration flow variables ($f_{i,p}$) may be relaxed without affecting solution quality or feasibility. In this case each restoration flow sub-problem for an individual failure scenario is a single commodity integer-capacitated network flow problem for which flows remain integral if demands and capacity are integral. This was pointed out and relied upon in the recent thesis by Wang [38], with reference to the basic properties of minimum cost network flows [37].

On the other hand, the relaxation of working flows is justified as an acceptable practical measure when attempting direct solution of the full unrestricted problem. Fractional working flows may arise in the solutions but our own experience, as well as work by Kennington [54] indicate that a simple "repair procedure" can re-integrate fractional working flows at minimal or no impact on the objective function cost. Picavet and Demeester [36, p. 122] also comment on the gap due to working flow relaxations being only ~1% in their experience with the same issue. Also, in context of the later step W1 and S2 sub-problems, the relaxation of working flows is acceptable since those phases only have the purpose of nominating edge candidates for step J3. And J3 can typically be solved without working flow relaxation if desired.

If any relaxations are to be considered at all, the choice of integer working and spare capacities and relaxed flows is also advantageous over integrality on flows with relaxed capacities because there is one such capacity variable for each edge but there is a working flow variable on each edge for each demand pair in the problem and a restoration flow variable on each edge for each other edge in the graph.

Complexity

To assess the number of variables and constraints in a direct solution of MTRS, let us define $Y=N(N-1)$ to represent the number of all possible unidirectional edges in an instance of MTRS. Then we have: Y edge selection variables, Y working variables and Y spare capacity variables, $Y(Y-1)$ restoration flow variables, and (assuming all O-D pairs may exchange demands) another Y working flow variables. The total is $2(Y+Y^2)$ or $2(N^4-2N^3+2N^2-N)$ variables of which Y are $\{1,0\}$. Also allowing that all nodes may exchange demands, (17)–(19) generate $2Y+Y(N-2)$ constraints. (20) adds Y. (21)–(23) add $2Y+Y(N-2)$. (24) adds $Y(Y-1)$ and (25) adds Y constraints. The total number of constraints in an N node problem is therefore $(N^4-N)$. A 50-node problem will therefore have over 12 million variables in ~6.25 million constraints. Clearly this is a problem for which approximations or other simplifying decompositions can be justified.

Three-Stage Approximate Solution Method

This section gives a qualitative appreciation of the counteracting effects involved in MTRS followed by description of the proposed three-step heuristic solution method.

An appreciation of Interacting Effects

Figure 1A:
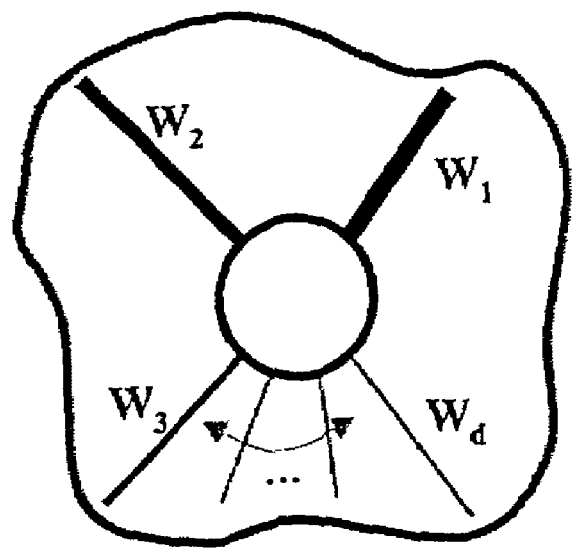
FIGS. 1A and 1B are isolated nodal views of restoration considerations leading to the 1/(d−1) lower bound.
Figure 1B:
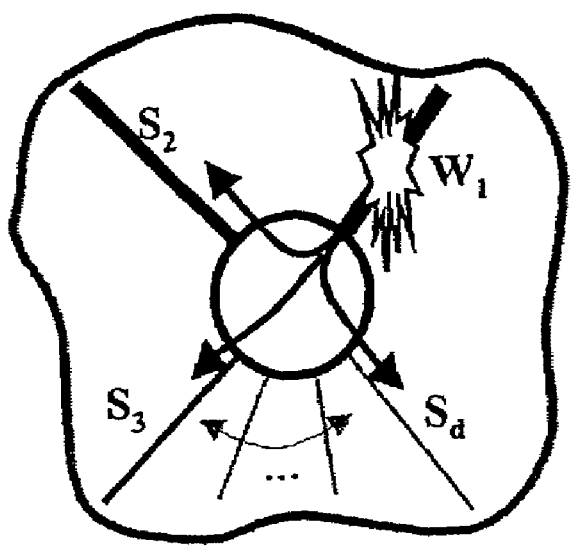

Spare capacity sharing: Taken by itself, the total amount of spare capacity required to make a network restorable via span restoration reduces with higher average nodal degree. Generally, there will be a $1/(d-1)$ form of reduction in spare capacity cost as network average nodal degree, d, is increased [1,41]. This is an economic push towards high graph connectivity. To explain this further FIGS. 1A and 1B show a node of degree d. Consider the failure of span 1, having $w_i$ working capacity. Obviously the node must have enough spare capacity on other spans 2 . . . d to permit restoration of $w_i$. Similarly, (in the absence of global network considerations that may add more spare capacity), each span i requires for its restoration that the total amount of spare capacity on surviving spans meets or exceeds the working capacity on the failed span. It follows that in the best case from an efficiency standpoint, every span could have $w_i=w_i$ in which case the ratio of spare to working capacity (which we call the redundancy) becomes:

$$\frac{\sum_{j\in 1\ldots d} s_j}{\sum_{j\in 1\ldots d} w_j} = \frac{d\cdot w_l/(d-1)}{d\cdot w_l} = 1/(d-1)$$

Figure 2:
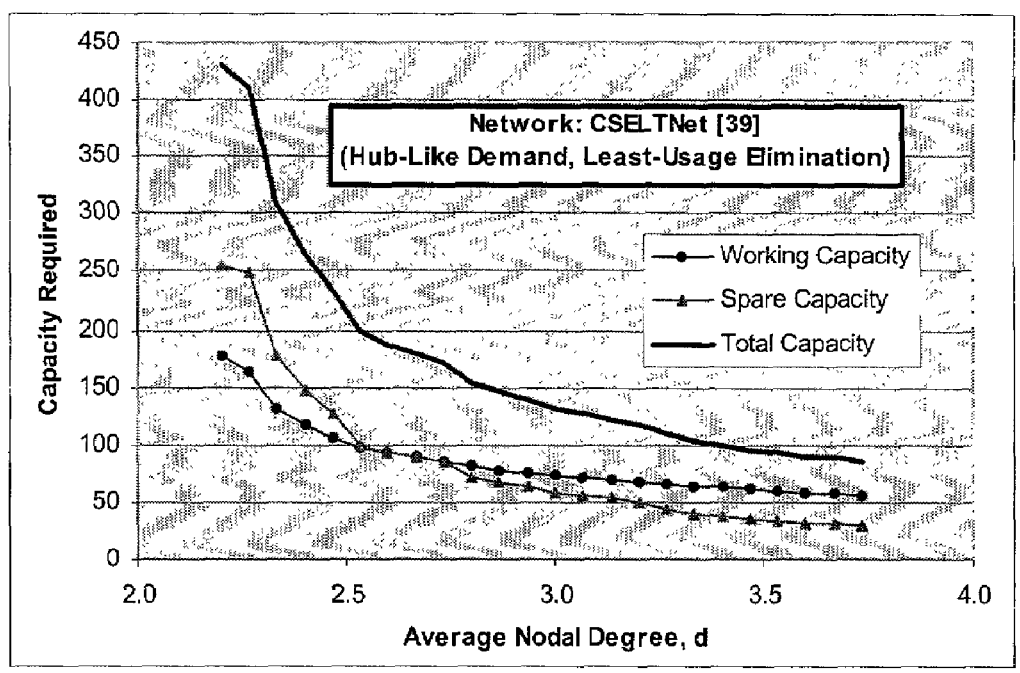
FIG. 2 is a graph showing experimental trials illustrating spare and working capacity versus average nodal degree.
Figure 3A:
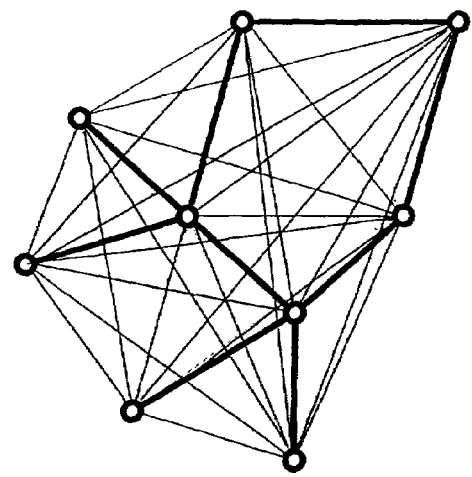
Figure 3B:
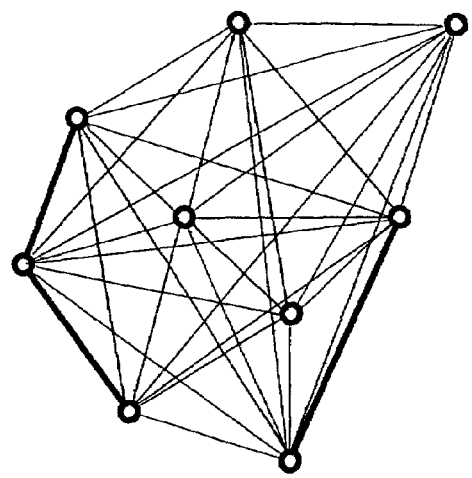
Figure 3C:
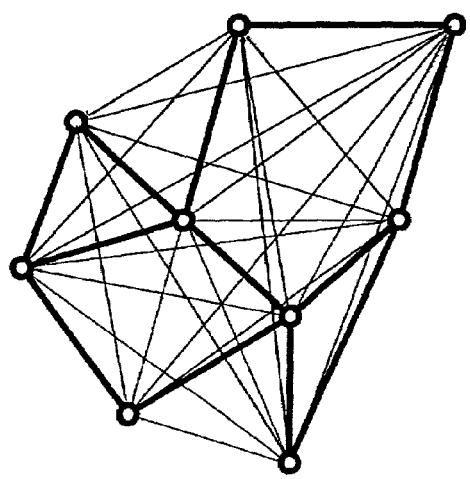
Figure 3D:
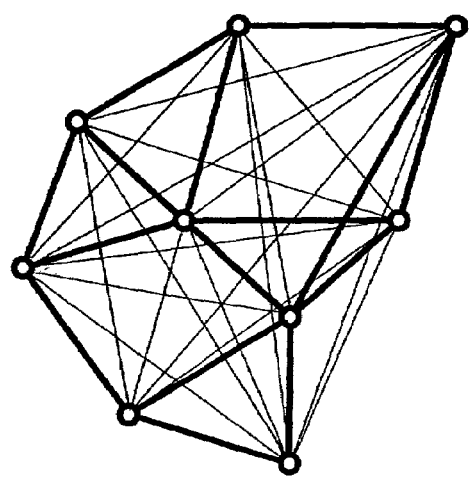

This is a simple lower bound on the redundancy required for survivability based on purely topological considerations. This is also the basis for intuition that the capacity-efficiency of a mesh-restorable network is greater on highly connected graph topologies. Although it takes a purely isolated nodal view, it is found experimentally that the restoration flow-limiting cutsets in an efficiently designed span restorable network are most often incident to one or the other end-nodes of the failure span [17], giving practical validity to this simple line of reasoning about how nodal degree will affect spare capacity. It is both interesting and supportive of this point to look at a series of design trials where graph degree is systematically varied. FIG. 2, drawn from separate previously unpublished work by the authors, shows a typical result of a series of trials where the number of graph edges was systematically reduced from a relatively high-degree starting network [39] down to a minimal bi-connected graph. At each stage we take the current topology and route demands via shortest paths, then solve the SCA problem for the corresponding spare capacity requirement. The graph edge with the least working capacity at each stage is removed before going to the next stage. Over several such series of trials, with or without joint optimization, the resulting curves were remarkably consistent with the basic characteristics shown in FIG. 2 regardless of the demand pattern or exact sequence of removals to reduce the topology. The main observations are:

Both working capacity and spare capacity decrease monotonically with increasing network degree.

The spare capacity requirement drops more quickly than working, and continues to respond for longer than the working capacity as degree increases.

With little variation, the cross-over point (where spare capacity drops below working capacity) occurred at d=2.6 to 2.8.

The total working capacity requirement was often nearly constant or decreasing very slowly shortly after the cross-over point.

The total spare capacity often continued dropping significantly to well past d=3.5

A numerical fit to the ratio of spare to working capacity is consistent with the $(d-1)^{-1}$ functional form.

Spare capacity drops more rapidly than working because it benefits in two ways from higher connectivity: first, in the presence of a fixed hop limit, the diversity of eligible routes over which spare capacity sharing can occur increases non-linearly and, secondly, the average number of working paths crossing each span to be protected decreases as working path routes shorten. From these trials we can also observe that unless the fixed charge for spans was very high relative to capacity routing costs, a mesh network should generally have a degree of 2.6 to 2.8 or higher because it is above this crossover point that the investment in spare capacity becomes more and more highly leveraged.

Span Establishment Cost: On the other hand every new span added to the topology will have a fixed "establishment" cost. This makes a contribution to total costs that is proportional to the number of spans and their distances. The min-cost spanning tree represents the least investment in span establishment costs that allows communication between any two nodes. Trees, however, are not restorable in our sense of automatic rerouting. The corresponding entity for a mesh survivable network (in the sense of minimum edge costs, all nodes connected, and restorable) is a minimum-cost bi-connected subgraph.

Working Path Routing: The next factor to consider (if taken in isolation) is again in favour of more spans not fewer. Every span we add will permit a shortened routing for some number of working paths. A demand traversing a three-hop route, (A–B–C–D), may be converted to a one-hop routing with the addition of a new span (A–D). This frees transmission capacity on spans (A–B), (B–C), (C–D). Traditionally in data, trunking, or leased line network design it is these beneficial routing effects (in their respective forms of queuing delay, blocking, or throughput) in counterpoise with the route establishment costs that determines an optimal topology alone. The shortening of working routes should continue to be a significant principle in determining an optimum mesh-restorable topology because as the topology becomes more connected the amount of both working and hence also spare capacity diminishes. Total working capacity (in capacity distance terms) also decreases as working routes shorten and generally the network as a whole also becomes less redundant as d increases. Eventually this means that the spare capacity savings from further increases in d are of less economic importance than further savings possible in the working demand flows. In other words, by achieving what we aim for in mesh restoration (to make the spare capacity perhaps only 40%–60% of the working capacity), we make further percentage savings on the spare capacity not worth as much in absolute terms as a corresponding improvement in working path routing.

Thus we propose a principle that "both working and spare benefit from adding spans, but as the topology becomes more connected the absolute pay-back shifts increasingly from spare to working capacity savings." This line of reasoning influences the topology design strategy that follows in that it suggests a certain basic priority: first design for efficient working-path routing, secondly design for efficient spare capacity adapted to the topology from the first priority. Also note that the context for this line of reasoning is still one of relatively sparse graphs in all cases (d<4 or 5) so that the majority of working routes are still traversing several spans en-route. The compact labels W1, S2, J3 used henceforth are meant to suggest: "step 1 for Working only, step 2 for Sparing only, step 3 for Joint reduced problem. Similarly the shorthand "J0" will be used to stand for the optimum solution attempt on the full MTRS problem.

Two-Connectedness: Finally there is a firm "bottom line" on the class of topologies that we can even consider for a mesh-restorable network. They must be two-connected or preferably bi-connected. A two-connected graph provides an edge disjoint pair of paths between every node pair, but may contain articulation nodes (nodes which are single points of failure). A bi-connected graph has no such cut-nodes and by implication has a min cutset between any O-D node pair that contains two or more edges. Such graphs are easily recognized visually; they are topologically closed with no degree-one stubs sticking out and no nodes that are evident pinch points. This class of graph is the conceptual parallel to the family of spanning trees that cover all nodes of a network that does not have to be restorable in our sense.

The Three-Step Solution

Based on the above considerations, we set out to test the following three-step approximate solution method for MTRS. Briefly, the three stages (FIG. 1) are:

Step "W1". Solve a (working-only) fixed charge plus routing problem (FCR). Edges identified at this stage are collectively sufficient for routing and, we hypothesize, are of high merit for consideration in a complete design by virtue of their key role in serving working demand flows. Any pre-existing edges are represented as edges that have zero fixed charge for their establishment.

Step "S2". Solve an artificial problem for the minimum cost of additional edges and capacity to ensure restorability of the working flows from Step W1. We call this a reserve network fixed charge plus spare capacity problem (RN-FCS). Additional edges identified by this step are collectively sufficient to enable restoration and, we hypothesize, are of high merit for further consideration in a complete design by virtue of their efficiency from a restoration standpoint. Physically pre-existing edges on which non-zero working flow arose in W1 and new edges decided upon in W1 are both represented by equality constraints asserting the associated edge decision variables, and the objective function excludes any fixed costs for those edges.

Step "J3". Solve a restricted instance of MTRS where the set of candidate edges include only the union set from W1 and S2, not the complete set of all possible edges for the unrestricted MTRS problem. The idea is that since MTRS is exponential in |A| there is very high run-time leverage on reducing the number of candidate edges. But solution quality may not suffer greatly if the reduced edge set consists primarily of edges that are of high merit from at least one of the standpoints of routing (W1) or restoration (S2). The restricted MTRS instance will select a final set of edges that are collectively sufficient for both routing and restoration and are of "high merit" jointly for restoration and routing.

Thus, the central hypothesis is that within the union of the edge sets arising from Steps W1 and S2 lies a sub-graph on which a high quality approximation to MTRS can be found. The computational advantage should be significant because the most onerous component step (W1) can be a partially relaxed and/or time-limited FCR problem instance. FCR is itself still a difficult problem, but for its use in the heuristic we do not necessarily need to solve it to optimality. Additionally, FCR is a widely studied problem with a considerable body of prior work and executable codes which could be brought to bear for solution of the FCR instance arising in W1. In comparison, the second step S2 will generally solve very quickly and the third step (restricted MTRS) will be exponentially faster than unrestricted MTRS to the extent that it uses a reduced set of candidate edges. Although the result is approximate in a global cost optimality sense, the J3 result is still an exact solution of the original MTRS model (exact in the sense of its problem structure being a 'true copy' of the full MTRS problem), so it is a fully feasible solution in terms of routing and restoration details. In other words there are no functional or constructional details that are approximate and have to be repaired as a result of obtaining the design by the heuristic. The rest of this section defines each step in more detail.

Step W1: (Working-only) fixed charge plus routing (FCR): Step one is to solve an instance of FCR without regard to any survivability considerations, within the universe of all possible edge selections for the problem. As such, the problem formulation for this stage is unchanged from that in paragraph 018 above. What we want going forward from this step is the topology selection outcome, the characteristic working capacity values, and the objective function value for later bounding use in J3 and J0. The detailed routing associated with the W1 FCR solution will not be retained through to the final design, so the working flow variables are candidates for relaxation to speed up this step. The idea is to produce a first topology on which a feasible routing solution exists together with the fixed costs for the selected graph edges that are in isolation nearly optimal if the goal was only to serve the working demand flows. This is a good foundation for the three-step design because in an efficient mesh-restorable network, the working capacity is expected to dominate the spare capacity. However, there is nothing in the FCR formulation that will assure that a restorable (two-connected) topology emerges. In fact trees may emerge at this stage. This step benefits computationally relative to the full problem by way of removing all restoration-related constraints and variables, and if needed, permitting the relaxation of working flow variables. Nonetheless W1 remains the most complex stage of the three-step method. This step may therefore also be time-limited. In later tests it may also use an artificially low edge-to-capacity ratio $\Omega$ to identify not just the edges that would be part of the optimum FCR solution at the full $\Omega$ but also to reveal other edges that may have been close to this qualification.

Step S2: Reserve Network fixed charge and sparing (RN-FCS). This step augments the topology from W1 to become two-connected while simultaneously minimizing the fixed costs for additional edges and the protection capacity costs placed on all edges to achieve restorability of the W1 working capacities. The result from W1 is an initial topology and set of working capacity $w^{ij}$ values on those edges, which fully serves the demand matrix. In S2 the topology from W1 is accepted as a set of "already existing" edges. In S2 only edges from W1 are considered as failure scenarios whereas from a restoration flow standpoint all existing or possible edges are considered. Restoration flows will be subject to the same fixed charges that applied in W1 for any edge that does not already exist at this stage. Thus, new edges will be added to the topology at this stage if they are justified on their combined merits of closing the graph and providing the best placement of restoration capacity.

This step benefits computationally relative to the full problem in three ways: (1) the edge decision space is reduced from all combinations of Y possible edges to no more than (Y−N+1) remaining edge choices (because at least N−1 edges were decided in W1). Even though N may be small compared to Y there is more than proportionate benefit on the run times, because the commitment to inclusion of the subgraph from W1 greatly reduces the number of remaining search nodes for a branch and bound type solver. (2) All working capacity and working flow variables and related constraints are eliminated. (3) not all Y (i.e., $O(N^2)$) possible span failure scenarios have to be considered, only the ~O(N) corresponding to the edges in the FCR solution from W1

RN-FCS:

$$\min \sum_{ij \in \{A-E1\}} \{c_{ij} \cdot s_{ij} + F_{ij} \cdot \delta_{ij}\} + \sum_{ij \in E1} c_{ij} \cdot s_{ij} \qquad (28)$$

$$\sum_{k \in A; j \neq k} s_{ij}^{ik} = w_{ij} \quad \forall\, ij \in E1 \qquad (29)$$

$$\sum_{kj \in A; i \neq k} s_{ij}^{ki} = w_{ij} \quad \forall\, ij \in E1 \qquad (30)$$

$$\sum_{ik \in A; k \notin \{i,j\}} s_{ij}^{nk} - \sum_{kn \in A; k \notin \{i,j\}} s_{ij}^{kn} = 0 \quad \forall\, ij \in E1; \forall\, n \notin \{i,j\} \qquad (31)$$

$$s_{ij} \geq s_{ij}^{kl}; s_{ij} \geq s_{ij}^{lk} \quad \forall\, (ij), (kl) \in A^2; (ij) \neq (kl) \qquad (32)$$

$$s_{ij} \leq K \cdot \delta_{ij}; \delta_{ij} = \delta_{ji}; \delta_{ij} \in \{0, 1\}; \forall\, ij \in \{A - E1\} \qquad (33)$$

$$\delta_{ij} = 1 \quad \forall\, ij \in E1 \qquad (34)$$

$$\sum_{ij \in A} \delta_{ij} \geq N \qquad (35)$$

$$\sum_{k \in N; i \neq k} \delta_{ik} \geq 2; \forall\, i \in N \qquad (36)$$

For clarity the objective function is expressed in two parts. First is the fixed charge costs for any additional edge selections at this stage, plus the cost of spare capacity placed on those new edges. The part recognizes costs for spare capacity that may be added at this stage to an edge already selected in W1. The set of edge selections already 'paid for' in W1 are passed into S2 in the set E1 where they are directly asserted as part of the S2 solution (34). In (33) the topology variable space is correspondingly reduced to {A−E1}. Constraints (29)–(31) relate the restoration flow variables $s^{kl}_{ij}$ for each (i,j) failure scenario to the amount of working flow to be protected. They form another instance of the familiar source-sink and transhipment constraints, with one instance for each failure scenario. Constraint (32) dimensions the corresponding spare capacity variable on each edge. The remaining constraints define the free edge selection variables and re-state the added knowledge topology constraints.

A variant on the overall heuristic is possible at S2. This is to solve a jointly optimized mesh routing and spare capacity type of problem at this stage, with the same partially given topology from W1. The difference in the S2 formulation is analogous to that explained in paragraph 33 for adding joint optimization of working path routes to SCA. In the later case, working path routes are optimized jointly with the assignment of spare capacity. This variation is hypothesized to trade increased run time in S2 for possibly improved solution quality in J3. If both variants are implemented, a further option is to form the union of all edges identified by W1 and each version of S2 as the edge-pool within which the J3 instance is solved.

Step J3: Restricted MTRS for final topology selection and joint capacity allocation. The last step addresses the global co-ordination of working, spare and topology considerations that are inherent in the full problem but not present in the design at the end of S2. The augmented edge set at the end of S2 can only be retained or reduced by this step. Step J3 can also make use of a bound obtainable from the result of W1, described below. In addition, the J3 objective value can be fed into an unrestricted (J0) instance of MTRS as an upper bound when attempting to solve for an optimal reference solution. In summary (see FIG. 1), the three steps play the following roles:

W1. Finds a minimal topology and capacity as justified by working flows alone.

S2. Finds a min-cost topology augmentation as justified by restorability considerations alone.

J3. Revises the working flows of W1 to exploit the augmented topology of S2 and coordinates them with the assignment of restoration capacity and selection of edges so as to minimize the total cost of realization.

Once the final topology is found, it may be implemented (step 1 in FIG. 1) in conventional fashion by obtaining the necessary right-of-ways, and installation of the necessary communication links and nodal equipment, for each span and node to be added. In the case of modification of an existing network, only the new spans and nodes need to be implemented.

Bounds for Use in J0 from Steps W1 and J3

At two stages in the heuristic we can also obtain bounds to aid in solution of either the restricted or unrestricted MTRS problem. Specifically, if steps W1 and J3 are individually solved to optimality it follows that the objective value from W1 is a lower bound on the cost of the full MTRS problem. Any feasible solution for fixed charges, routing and spare has to cost more than an optimal solution for FCR alone. A tighter lower-bound can be identified that applies on a sub-set of the variables in the MTRS objective function by applying the same line of reasoning to the topology plus working capacity variables only within an MTRS problem. That is to say that:

$$\sum_{ij \in A} \{c_{ij} \cdot w_{ij} + F_{ij} \cdot \delta_{ij}\} \geq \text{obj.(step W1)}. \qquad (37)$$

because the component costs for the fixed charge and routing solution (alone) that are embodied within a full MTRS solution can only make compromises to accommodate the wider set of considerations in MTRS compared to the pure FCR solution from W1.

The second bound to help in solution of an unrestricted MTRS problem comes from the J3 solution. Because MTRS and Step J3 of the heuristic are identical models, but with J3 being restricted in the number of edges to consider, the objective function from J3 must be an upper bound on the corresponding instance of full MTRS solved to optimality. That is:

$$\sum_{ij \in A} \{c_{ij} \cdot (w_{ij} + s_{ij}) + F_{ij} \cdot \delta_{ij}\} \le \text{obj.(step 3.)}. \quad (38)$$

We make use of these relationships as added side-constraints to help solve our J0 reference instances of unrestricted MTRS.

Testing And Results

Experimental Method: Round 1

Two main rounds of experimental trials were conducted. The Round 1 series of test problems were based on nine, ten and fifteen-node problem instances. With due regard for the difficulty of solving the whole problem directly, we started with these small test cases for which we expected that we could obtain full CPLEX terminations to provide optimal reference solutions to evaluate the heuristic. A group of tests were completed for each problem size based on different edge-to-capacity cost ratios ($\Omega$) and universes of possible edges. All cases at nine and ten nodes used a set of nodes placed at random (x,y) coordinates in the plane whereas the fifteen node cases are based on a previously published network [33]. In all cases the Euclidean distance between nodes was used as the length, $l_{i,j}$, of the candidate edge between those nodes. The fixed charge for establishment of that edge in the topology would then be $l_{ij} \Omega$ and the cost per unit of capacity added to an edge was $l_{ij}$. In other words, the cost per unit distance—unit capacity was defined as unity. In the nine and ten-node problems we allow all possible edges to be considered and there is a non-zero demand value for every O-D pair. Although the number of nodes is small in these initial test cases, experience with their solutions suggest that in some senses they are larger problems than the fifteen-node cases because of the completeness in their candidate edge universes and complete demand matrices.

The third set of tests was based on 15 node problems in which the candidate edge sets and demand sets are not complete in the all-pairs sense. The spatial layout of the 15 node problems was based on a previously published transport network model [33] with an initial set of 28 graph edges, to which we added an equal number of randomly chosen, but plausible additional edge choices. By plausible we mean that the expanded set of possible edges is predominated by additional planar edges to next-neighbours and neighbours that were not often more than twice the average inter-nodal Euclidean distance away in the plane. The actual set of candidate edges admitted to the Round 1 problems is shown by light lines in the background of the figures that follow. The resultant test problems thus have either a full mesh of potential edges or a universe of candidate edges that is at least four times the characteristic degree of real transport networks, and slightly non-planar.

To produce demand patterns for the test cases a complete non-zero demand matrix was initially generated for all O-D pairs using a gravity model. In the 9 and 10-node test cases the complete gravity-based demand patterns were used directly. In the 15 node cases half the possible demand pairs were set to zero. This was done in an unbiased way by selecting every second O-D pair from an unsorted list of all the gravity-based demand values, and assigning it a zero value. Data files defining test problem instances (node locations, demands, and $\Omega$) used here are available by ftp [34].

All steps of the heuristic and the MTRS master problem were prepared in AMPL (November 1998 version) and solved with the CPLEX 6 MIP solver on a four ×250 MHz Sun Enterprise processor running the Sun Solaris Operating System 2.6 with 892 MB of RAM. The recorded run times are actual CPU seconds (not elapsed time) but on the four-processor unit as a whole (i.e., 1 CPU second measured this way is equivalent to all four processors devoted to the CPLEX task for 1 second). A CPLEX priority file was used directing it to first branch on topology variables, secondly on the integer capacity variables. (Preliminary experimentation showed significant speed-up by directing the priority on the edge selection variables). The longer more difficult runs were also user-guided to an extent in terms of altering the node selection strategy of the MIP solver to manage the memory size of the search tree and improve the solution times. CPLEX allows the user partial control over the manner in which branches of the branch-and-bound tree are explored. The user can chose from several rules or strategies on selecting the next node in the tree to process when the current node is found to be infeasible or otherwise judged to be un-promising. The default strategy is a best-bound search which chooses from the remaining unexplored nodes the one with the best objective function for its associated LP relaxation. A best-estimate search selects the node which gives the best estimated integer objective value, and a depth-first search selects the most recently created node. By varying the node selection strategy we were often able to quickly exhaust portions of the branch-and-bound tree that another strategy may not explore for quite some time. It has been observed that by initially utilizing the default (best-bound search) strategy for some time, then choosing the best-estimate search, and finally the depth-first search (sometimes cycling through the 3 strategies several times), a good (or optimal) solution was usually found more quickly than remaining with a single search strategy. We found that when the size of the branch-and-bound tree stops growing (or at least slows its growth), this appears to be a good signal to switch to the best-estimate and depth-first search. When the depth-first search is used, the size of the tree often diminishes, but if it begins to grow once again, this is often another signal that switching back to the best-bound search would be preferred. These principles were employed in a general way in managing each of the longer runs. The recorded time is the result of all efforts as employed on each case individually.

For each test case the sequence of runs was first to do Steps W1, S2, J3, for the heuristic. With the benefit of the objective function values from W1 and J3 to use as side-constraints (as explained above) a reference solution to the full MTRS problem would then be attempted, to complete the results for that test case. Note, consequently that in cases where MTRS runs to the time limit without finding any feasible solution at all, it means that CPLEX could not find a solution that improved upon the heuristic's objective function value as an upper bound, within the allowed time. (When the upper bound on the objective function from J3 is not employed, feasible solutions are found as expected, but rarely are less that twice the objective value from J3 in 6 to 18 hours). Except where indicated (in two cases at 15 nodes), each step of the heuristic was individually solved to optimality for its respective sub-problem. In the cases to be mentioned the W1 (FCR) sub-problem was deliberately limited to 15 minutes.

Round 1 Results

Tables 1 and 2 summarize the Round 1 results. The test case name, (for example 9n36s4-15) indicates the number of nodes (e.g., 9), the cardinality of the universe of candidate (bidirectional) edges (e.g., 36 is a full set of candidate edges for 9 nodes), the random instance number (where there are different random arrangements of the same number of nodes) (e.g., 4) and $\Omega$, the ratio of edge-selection cost to unit-capacity cost on an edge (e.g., 15). Where more than one instance of the same size problem is indicated, the location of the nodes and the vector of O-D pair demand magnitudes are re-randomized. Table 1 first gives the test case details, then the objective function values and run times for each step of the heuristic, followed by details of the full MTRS reference J0 solution that was attempted. In the S2 objective values, only the variable cost components of the S2 formulation are recorded (i.e., the cost of edges and working capacity from W1 are not repeated in the S2 objective values). The total cost of the network at S2 is the sum of the edges selected and working capacity costs from W1 plus the objective function for S2 (added edges for graph closure and spare capacity cost).

Table 1 records three types of J0 reference solution results based on the type of CPLEX termination obtained. "IF" means that in the time given, the solver was not yet able to find a feasible solution. "FT" results were solved to optimality (a full termination) by CPLEX, in the times shown. "TL" results are cases where the CPLEX did produce a feasible solution but the run was time-limited. The time-limited objective values may be lower or higher than the heuristic. In the latter cases we report the gap of the heuristic against the time-limited CPLEX performance. For instance, "within X % of the result from 6 hours of CPLEX time." In these cases we do not use the usual CPLEX report of a remaining gap to the best LP lower bound as lower bound against which to test the heuristic because the gap to the LP relaxation is virtually meaningless. The best LP lower bound in such cases typically shows the MIP solution having 50–60% gaps, even seconds before an optimal termination is reached by branch and bound. This is because relaxation of the edge variables removes the most fundamental structure of the problem. The third type of termination are cases where an allocated amount of time running the unrestricted MTRS (J0) problem on CPLEX did not yield any improvement over the heuristic solution and the J3 objective value was used as an upper bound. Such cases have the IF indication standing for no feasible solution found in the time given. These cases can be read as meaning that "the heuristic result could not be improved upon in X hours of CPLEX run time". In other words the full problem remained completely infeasible in the allotted time when given the J3 heuristic result as an upper bound. These were generally unexpected outcomes especially given the length of time the full problem would run without even reaching feasibility. Usually providing the result of a heuristic to upper bound the optimal solution is expected to reduce the search space and thereby speed discovery of superior or an optimal feasible solution. However, even with this benefit the full problem instances remain infeasible in the IF cases. We discuss this in more depth later but it seems that in these cases the solver cannot seem to find even one feasible low-weight edge vector (i.e., one that uses relatively few edges but still forms a closed connected topology) on which edge costs alone are under the J3 objective value.

Table 2 records information about the number of edges in the topology as it evolved under Steps W1-J3 in the heuristic and compares this to the number of edges in the attempt at a reference solution for the full problem. The S2 column in Table 2 records the total number of edges in the S2 solution graph including the edges inherited and used from Step W1. This is followed by the number of edges in the S2 graph that were not in the W1 solution. When an edge from W1 is not used (has zero spare capacity) in the S2 solution, the S2 edge total will not match the W1 total plus the number of "new" edges. Such cases are indicated with an asterisk. Table 2 also records observations on the number and role of new edges added at S2 in terms of contributing to closure, etc. Table 2 shows that the solutions of S2 could exhibit three types of edge changes relative to W1. An edge could be added in a way that provides both graph closure and bears spare capacity, or just bears spare capacity but does not contribute to closure of the graph. A third type of change from W1 to S2 is an edge that was present in the W1 topology, but is not logically present in the reserve network overlay design of S2. These are edges from W1 that bear no spare capacity in the S2 solution. Table 2 also shows that, in all but one case, the J3 solution used all edges in the union of W1 and S2 edges. Only in problem 15n28s1-20 (Case 9) did J3 "rationalize" the edge sets from W1 and S2 in the sense of reducing from 23 candidate edges in the union of W1, S2 to 21 edges in the J3 solution. This was a somewhat unexpected tendency which is discussed further below.

Round 1 Discussion of Results

The nine-node test cases yielded one fully optimal reference solution (case no. 4: 9n36s4-15) with a gap of 7.7% for the heuristic. The heuristic, however, ran in about 5.2 minutes whereas 73 hours was needed to obtain the full termination reference solution. We also have a suggestion in Table 2 that the heuristic solution was using too few edges (three less than the optimal solution). In two other nine-node problems, 6 and 18 hours were allocated to running the reference solution with the benefit of the upper and lower bounds from the heuristic, but no improvement was obtained over the heuristic within those times. In the remaining nine-node case (9n36s1-15), 6 hours of CPLEX time yielded a reference solution 3% better than the heuristic result which was obtained in 2.7 minutes. FIGS. 3A–3D illustrate the W1, S2, and J3 topologies for case no. 4, and the optimum topology which is available for this problem.

The initial set of nine-node problems confirm as expected that S2 and J3 run very quickly while the heuristic run time is dominated by the FCR instance in Step W1. This suggests the later strategy of time limiting W1, which is tested in the 15-node problems. It was also noted that in all four nine-node cases the J3 solution uses all edges promoted for its consideration by prior Steps W1 and S2. This was somewhat unexpected as it was thought initially that the set union of edges from W1 and S2 would tend to over-populate the candidate edge set, leading to a reduction in J3. Related to this is the observation in Table 2 that the J0 reference designs, where obtainable, consistently use more edges than the heuristic employs. This suggested an aspect of the Round 2 trials where the cardinality of the edge set promoted by W1, S2, may be deliberately inflated by artificially lowering $\Omega$. On the other hand detailed inspection of results shows that at $\Omega$=15, this problem instance tends to be dominated by capacity costs not edge costs, so there may not be too much significance in the topology differences between J0 and J3 in this case.

Cases 5 to 8 are the 10-node problem instances with complete edge sets and complete demand matrices. In these cases, we saw again that J3 employed all edges provided to it from W1 and S2 again seeming to suggest that the first two heuristic steps may not be promoting a large enough set of edges to consider in Step J3. However, all four 10 node results were instances where 6 to 18 hours of CPLEX time running the J0 reference problem (with bounds) could not improve on the heuristic results. When the upper bound was removed (for validation purposes) the J0 problem immediately found feasible solutions but given 6 hours, reached objective values that were still 7% to 28% above the corresponding heuristic result. It is only in this sense that the "gap" for these results is reported as 0.0. As explained, it is the gap against a time-limited attempt on the full problem by CPLEX. FIGS. 4A–4D and 5A–5D illustrate two of the 10-node results showing a result from the unrestricted J0 MTRS problem along with the W1, S2, J3 heuristic results.

Figure 4A:
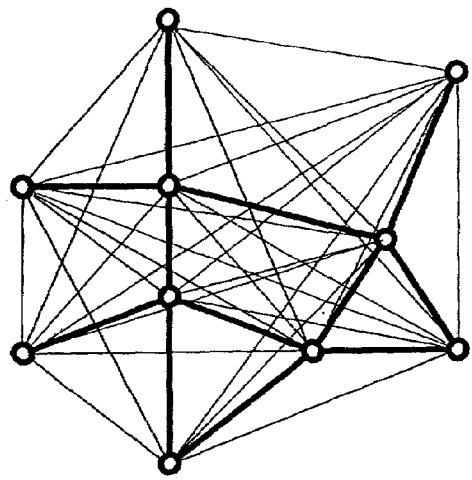
Figure 4B:
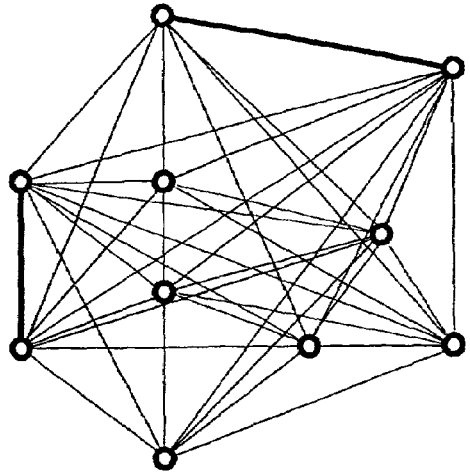
Figure 4C:
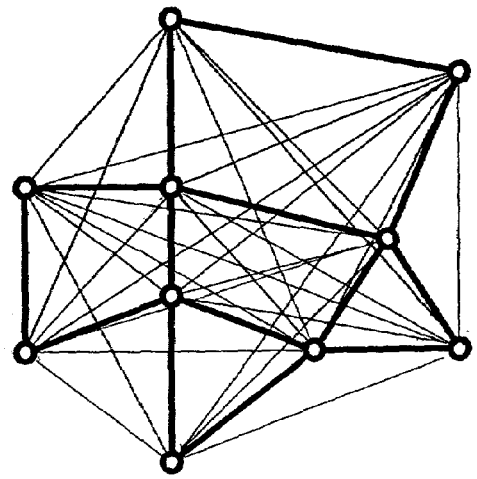
Figure 4D:
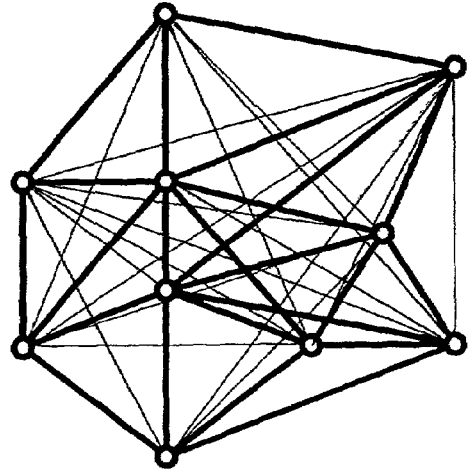
Figure 5A:
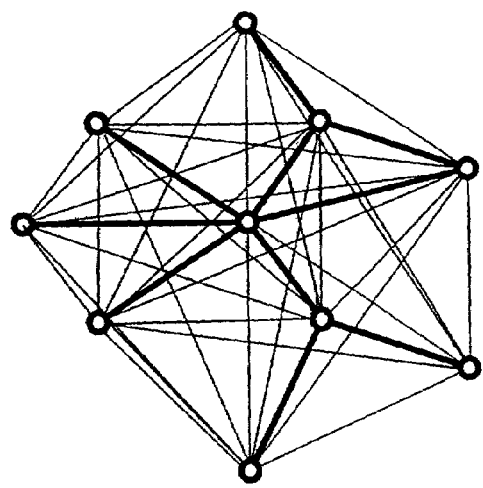
Figure 5B:
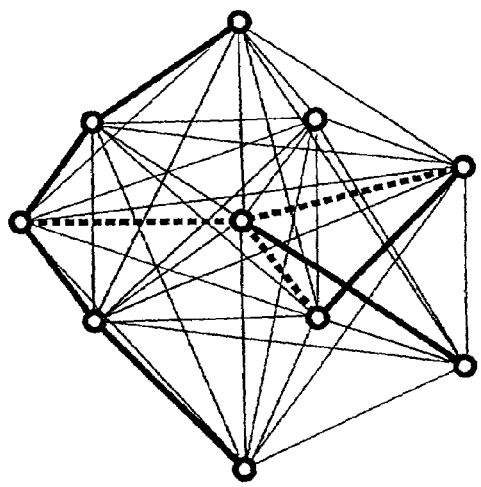
Figure 5C:
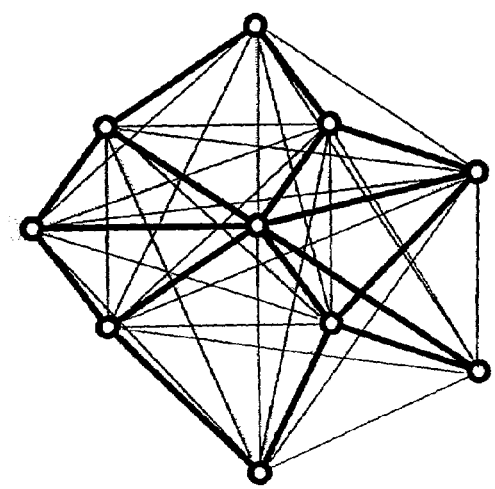
Figure 5D:
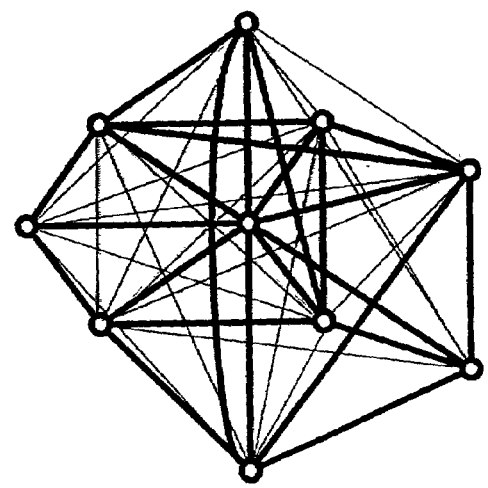

In Table 1 the J0 problem was run with the benefit of the J3 objective function as an upper bound, in an attempt to give CPLEX the best head start towards a fully optimal termination. In these circumstances we obtain no feasible result if the unrestricted MTRS instance cannot improve on the heuristic solution in the time available. On the other hand, we wished to view the unrestricted sub-optimal solution as it neared the 6–18 hour time limits, so we repeated the time-limited full MTRS runs without the bounds. This gives us a viewable topology for comparison, but not one that corresponds to the results in Table 1, because without the bound to start with, the results in FIGS. 4D and 5D are further from optimality than in Table 1. With this understanding, FIGS. 4D and 5D suggest that without the bound the attempt at optimal solution is still searching out in high connectivity topology space after 6–18 hours. With the bound, it has not even stumbled upon a closed topological arrangement similar to the heuristic's after 6–18 hours of search. In contrast the heuristic, by its nature, is directly guided into a region where topologically feasible arrangements of a not-excessive number of edges are immediately at hand.

The fact that the unrestricted problem fails to even reachfeasihility in 6 to 18 hours when the J3 objective value is supplied as an upper bound suggests that simply finding a closed connected graph on the relatively few edges associated with a near-optimal solution (the basic condition for feasibility) may be the most difficult purely combinatorial aspect of the complete problem. With the bound present, the solver appears to be searching almost at random for a low-weight combination of edge variables that describe a closed connected graph. The combinatorial space of numerous edge combinations that are not even feasible seems to be swamping any ability of the MIP solver to progress systematically towards a goal of finding even one closed connected graph on the few edges that are associated with near-optimality. Without the upper bound, the computational prospects are even worse. The solution becomes feasible but now a vast number of graphs are enumerated at far too high an edge count, and an investment of time is made in each of those for routing and capacity considerations. This is not a problem at all for the heuristic, however, as the W1 and S2 steps directly assemble a qualified near-optimal topology for the final tuning by J3.

Cases nine to 11 are 15-node problems sharing a common set of node locations and demand matrix. Only the number of candidate edges and $\Omega$ are changed. The Case 9 problem included as candidate edges only the 28 edges of the actual network as published [33]. Case 9 has a fully optimum reference result obtained in 477 seconds. This run time is much lower than for the "smaller" (node count) cases above because with only 28 edges to consider on 15 nodes any feasible solution involves a very high fraction of all candidate edges (here the optimum uses 20 out of 28) and at least 15 are required by closure. So the branch-and-bound tree for this case was actually considerably smaller than in the 9 and 10 node problems with complete edges sets. In this case the heuristic showed a solution gap of 6.5% and a total run time nearly equal to that for the optimal result. This suggests that when the candidate edge set is very constrained one could attempt to solve MTRS directly rather than use the heuristic. As before, the heuristics run time is dominated by the FCR instance in W1.

Cases 10, 11 are on the same 15 nodes but have 28 random additional edge candidates, for a total of 56 edges. This represents 53% of the complete $N(N-1)/2$ space of candidate edges. Now the graph solution space is on all combinations of 15 or more edge choices from 56 candidate edges. Based on this increase, and initial indications of high run times for W1 we decided to test the heuristic with a run-time limit of 15 min applied at Step W1. None of the ideas behind the heuristic actually requires that Step W1 (or S2) be strictly solved to optimality. Rather, the requirement is just that an FCR process identify a set of "high merit" edges for further consideration. The results in Table 1 suggest that this is a viable tactic within the heuristic framework: with time-limited W1 stages, the heuristic results, obtained in under 25 minutes, were 7 to 14% better than the unrestricted MTRS solution attempt at 6 and 12 hours, for $\Omega$=40 and 20, respectively. FIGS. 6A–6D show the W1, S2, J3 and J0 (12 hours) topologies for test case 15n56s1-20.

Round 2 Trials and Discussion

After studying the Round 1 results a second phase of trials was designed (i) to attempt more and larger test cases, (ii) to test the J3 step solved alone on a random edge set against the full heuristic, and (iii) to test a strategy of artificially lowering $\Omega$ in W1 and S2 steps to increase the candidate edge set provided for J3. Tables 3 and 4 summarize these additional trials which are based on a variety of 19, 20, 23 and 26 node problem instances. The 19 node problem is based on the layout of nodes of the network studied in [46]. The universe of possible edges is the set of edges as published in [46] with an additional 37 shortest edges not present in the original network. The 20, 23 and 26 node problems were based on a random layout of nodes in the plane. The universe of edges for the Round 2 problems were created by selecting the first k shortest entries of the ranked list of $\{\text{rand}(0,1)\,l_j\}$ values where $k<N(N-1)/2$ is the desired cardinality of the universe of edges for the test case. This results in a universe of random possible edges which has a bias towards containing short edges. Visual inspection ensured that each universe set was itself closed and each node had a degree above a minimum value of 3. The latter conditions were spontaneously satisfied for all Round 2 networks. For instance 20n80s is a network with average degree of eight and no node with d<3.

In Table 3 column 2 gives the number of nodes and the universe of edges for each test problem. Columns 3 and 4 give the $\Omega$ values used. The J3-J0 $\Omega$ is the "true" value for the design problem. Cases where the $\Omega$ values in W1-S2 steps are lower than in the corresponding J3-J0 runs are tests of a strategy to deliberately increase the |W1∪S2| edge set.

In each step-wise block of Table 3, the Time and Notes columns record how the problem was terminated. "TL" "FT" "IF" are as before.

Row 16 is illustrative of the table. First the problem designation 20n80s-100—100 indicates a 20 node problem with a universe of 80 possible edges and that all steps W1, S2, J3, J0 used $\Omega$=100. In Step W1, a 30 min time-limited run for fixed charge plus routing resulted in selection of 22 edges and 1889 units of capacity. In S2, 27 edges (including those from W1, implying 5 were added) were used for restoration and 1841 units of spare capacity were added in a fully terminated S2 run of 756 s. In Table 3 the objective value reported for S2 is the total cost at S2 completion of edges selected plus the W1 and S2 capacity. (Note this is different than in Table 1). At J3 the restricted MTRS instance was solved to full termination in 53 seconds. All of the 27edges from S2 were retained while the total capacity was reduced to 2880 (1546 working, 1334 spare). The Cap/Edge column records the ratio of total capacity cost to total edge costs in the J3 design. This is a diagnostic of how dependent the problem is on topology as opposed to capacity. When the ratio is high there may be many near-optimal topologies. The ratio can also be indicative of the computational difficulty. If either capacity or edge costs are strongly dominant, the problem can be easier to solve to optimality. The design intent of the trials was to have both capacity and edge costs be significant in the problem. The Cap/Edge column shows that this was the case except, understandably, where the $\Omega$ values were greatly depressed in tests of the strategy for increasing the size of the |W1∪S2| edge set.

Under the J0 columns of Table 3, we give details of the attempt on an unrestricted optimal reference solution. In the Row 16 example the reported result is from 6 hour time-limited J0 run without the added bounds from W1 and J3. As before, running J0 without the bounds at least enables feasibility, so we can see where the J0 problem gets to on its own within the 6–12 hours allotted for the attempt. In this case at time-limited termination of the 6 hour run, the best J0 solution found uses 50 edges at a cost 127% above the J3 heuristic result. In all cases in Table 3, if J0 is run with the W1-J3 results as bounds the problem remains completely infeasible for at least the 6 to 12 hours we allotted for the solution attempt. Again, infeasibility in this context (i.e, with the bound) means the solution from J3 could not be improved upon in the time given. The one difference to this pattern is shown in the J0 results for all tests of 26n104s1 problems. As indicated these problems remained infeasible up to the 6 hour time limit even without using the result from J3 as an upper bound.

Row 17 records a trial aiming to improve heuristic solution quality by reducing $\Omega$ to 50 in W1 and S2. The tactic is seen to work in terms of promoting more edges candidates (26 versus prior 22 for W1 and 33 versus 27 for prior S1) in the W1∪S2 pool for J3. The corresponding J3 solution at $\Omega$=100, however, still elects to use exactly the same number of edges as before (27) but now the objective value is slightly worse. As we reduce the $\Omega$ values for the W1 and S2 steps even further (in rows 18, 19) we see the J3 objective values worsen further. This was an initially unexpected effect. The thinking was that if we bias the W1 and S2 stages to an artificially low $\Omega$ we would simply qualify edges for J3 to consider, and that doing so could increase run time but should only improve the achievable solution quality. This was partly also motivated by observation that in Round 1 trials the J3 problems were solved extremely quickly, compared to W1 and S2, so it seemed practical to give J3 more edges and invest more run time at J3 to improve solution quality.

But evidently there are counter-acting effects. One is that even a slight increase in the number of edges offered to J3 can make its run time take-off exponentially. Here, in Row 17, the use of $\Omega$=50 (instead of the "true" $\Omega$=100) inflated the W1∪S2 pool for J3 from 27 to 33 edges. The additional 6 edges makes the J3 instance go from under a minute to over an hour of run time. Thus, as happened here, it may hit a time-limit and obviously this can hurt the solution quality. But more fundamentally, even if run time limits are not involved, the W1 and S2 edges identified at $\Omega$/2 are well suited to $\Omega$/2 and are not necessarily as well-fitted to use at $\Omega$. Ironically, this is consistent with the basic hypothesis that W1 would identify intrinsically "good" edges for its purposes at the given $\Omega$ values, and similarly for S2 at $\Omega$. Therefore, we can indeed promote more edges by lowering $\Omega$, but that set—even though larger—does not necessarily contain the same edges that are "good" at the full $\Omega$. Detailed comparison of results for edges in Row 16 versus Row 17 tends to confirm this: only 23 of the 33 edges of in Row 17 ($\Omega$=50) are also present in in Row 16 ($\Omega$=100). A further special effort was made to see if the J3 instance with 33 input edges arising from depressing $\Omega$ to 50 in W1 S2 would solve to optimality if given more time. The attempt of 19 hours is summarized in Row 17b of Table 3. At termination the 19 hour J3 result had improved by 0.02% on the 1 hour J3 result and was using 26 solution edges as opposed to the 27 edges in Row 17.

This effect, combined with the prior observations that J3 rarely eliminates more than one or two edges, suggests a somewhat different understanding about the heuristic than at the start. Rather than W1 and S2 nominating an pool of high merit edges from which J3 will "choose" a subset, it seems more accurate to say W1 and S2 almost directly assemble a high merit topology and J3 makes only minor refinements to topology as possible under the final co-design of working and restoration routes and capacity. At the same time, these findings and arguments do not completely rule out benefit from the "depressed $\Omega$" strategy. Here the idea of $\Omega$-depression was tested at levels of 50% or more reduction in $\Omega$ for W1 and S2 stages. However, if one was using the W1-S2-J3 heuristic in an extended study of a single planning problem, a range of most slight $\Omega$-depression tests (only 5–15% say) would still be recommended to search for enhancements over the basic single $\Omega$ W1-S2-J3 procedure. At more moderate levels of $\Omega$-depression one may still promote some additional edges for J3 consideration, without degrading the suitability of the edge set in the vicinity of the full $\Omega$ as much as a 50% reduction evidently can do.

The other groupings of test results in Table 3 (19n74s, 23n92s, 26n104s) exhibit the same general behaviours, although with a few special notes. In the largest test cases, those for 26n104s, we started seeing even the J3 subproblem become infeasible in an hour of run time, albeit only for test cases where $\Omega$ was so low as to result in 66 to 70 edges in the W1$\Omega$S2 edge set for J3. It was not possible to solve any of the Round 2 J0 problems to optimality in the times given. The best feasible solutions to the unrestricted J0 problems were all more than 50% more costly that the J3 stage heuristic result. In all cases the 6–12 hour J0 solutions were also characterized by far too many edges in their best feasible solution when stopped. For instance, there are 47 edges in the best J0 solution to 19n74s-100—100 (Row 6) after 6 hours, whereas the corresponding W1-S2-J3 solution required 2hrs 55 s in total to reach a solution using 26 edges at less than half the cost of the 6-hour J0 result. The case for 29n92s1-100—100 (Row 25) uses 34 edges in the J3 solution whereas the corresponding J0 result has 57 edges. Our interpretation of this repeatedly observed effect is that the J0 problem is "bogged down" in high-weight edge-vector space. There are combinatorially many more high connectivity graphs. Simple discovery of low-weight edge vectors that describe closed connected graphs (where the optimum solutions really lie) is very difficult for the branching search on edge variables. Because the full-LP relaxations are so terribly weak as lower bounds, the solvers progress is relatively un-guided. Hence the nodes it visits tend to be high-weight edge vectors simply because these are statistically much more frequent in the population of all possible closed connected graphs. This is the main insight we offer about why the MTRS problem is so exceedingly difficult to solve by MIP methods.

Comparison of the Heuristic to Random

Table 4 summarizes tests where steps W1 and S2 are replaced by direct proposal of a pseudo-random edge set as input to the J3 problem. The logic is to ask: Do the W1-S2 stages really identify an edge set for J3 that is significantly better than a "random" bi-connected graph? To test this a series of trials were based on the 20n80s node-set and demand pattern (and $\Omega=100$) and varying numbers of random edges. For instance in Table 4 Case R5 is the 20n80s1 problem from Table 3 solved only by J3 when provided with a random but bi-connected arrangement of 27 edges. R6 is another set of 27 edges. All these trials are compared against the single run of the full heuristic in Row 16 of Table 3. The notionally "random" edge sets are, however, quite a bit better than truly random in most respects that are relevant here. The probability that a truly random 1/0 edge selection vector even describes a closed connected graph is extremely small. Consequently the pseudo-random graphs used here were made instead by asking a person schooled in network planning to work with a visual portrayal of the master set of 80 edges on 20 nodes and eliminate edges until the target number remained for the trial. At the same time they had to keep the graph closed, connected, and "like a real transport graph". The resulting graphs look characteristic of real transport graphs and are slightly non-planar but are dominated by mutually planar edges between nearest-neighbours in the plane. It should also be mentioned that the initial universe of 80 potential edges is itself also biased at its creation (see paragraphs 98–105) towards inclusion of short edges. The series of 18 random trials also is given the benefit by design of constituting a "sweep" through the range of average nodal degree where the best topology is likely to lie. In all these regards, the test cases here are more like challenges against a human planner's direct suggestion of plausible topologies on which to solve the restricted (J3) problem, without W1, S2 steps.

Instances R1–R6 solved quickly to a full J3 termination but the objective values are 8.4% and 40% worse than solutions obtained with W1 and S2 preceding J3. Trials R8–R18 had to be time-limited to one hour. All results are inferior to the one run of the full 3-step heuristic (which ran in a total of 44 min.), by an average of 13% with single values up to 25%. One of the random trials (R11 using 28 edges) was within 1.2% of the heuristic result (which uses 27 edges). That result cannot, however, be claimed in isolation from the total effort of the 18 trials that were required to find it (~12 hours of computing and ~30 min. each for manual design of each pseudo-random topology). These results seem to confirm that in the one 20n80s test case, the W1-S2 stages are at least significantly better than random in constructing an edge set for the J3 solution. It is interesting nonetheless, to note how relatively insensitive the test problem is to details of the proposed topology, especially when the pseudo-random graph provided a larger number of edges. This test case is, however, one where the solution is almost equally dominated by edge and capacity costs. In cases where edge costs are more dominant it is probably harder for the pseudo-random graph proposal method to do as well. Nonetheless there is a suggestion here that an algorithmic procedure generating a succession of closed connected pseudo-random graphs for J3 solution may do well when there is time to invest in many J3 solutions, whereas the W1-S2 heuristic steps would be preferred in contexts where a "good" result is desired from a single J3 run.

A related idea involving the pseudo-random graphs is to use them as enrichment for the W1∪S2 edge set from the basic heuristic. Space does not permit additional results of this type but experience suggests that the practicality of this approach may be limited by the relatively small number of edges that can be added while keeping the J3 run-time manageable. Recall that, for example, 20n80s1 J3 solution time goes from 53 sec at 27 edges to over 1 hour at 33 edges (in Table 4, Rows 16 versus 19). In such a case it would be feasible to add at most three or four edges to the W1∪S2 edge set. But the disjunction of the W1∪S2 edge set with the pseudo-random graph would generally contain more than three or four edges, so one would need some further criterion as to which few to select to enrich the edges set provided to the J3 stage. Overall it would seem that the best way to use a set of pseudo-random graphs, if available, would be to use them for alternative J3 runs, to see if an improvement over the W1-S2-J3 sequence can be found, rather than attempting to run J3 on the union edges set of W1∪S2 with an additional pseudo-random graph.

Relaxations for Lower Bounds for the Optimal Reference Solutions

The results repeatedly show the heuristic producing designs that cannot be improved upon by CPLEX running the full problem for up to 18 hours. Only in two of the Round 1 problems could we obtain a provably optimal reference result, and one of those took 73 hours. There is therefore far less data than we would ideally like, against which to assess the absolute solution quality of the heuristic. In such cases one generally attempts to see if a tight lower bound on the optimum might be available as a surrogate for optimal reference solutions. A series of simple relaxations were therefore also run for each of the test cases in Round 1, attempting to lower-bound the unrestricted J0 reference solutions. The relaxation strategies were: LP—complete relaxation of all capacity, flow and edge variables, Wrlx—only working capacity variables relaxed, Srlx—only spare capacity variables relaxed, WSrlx—working and spare capacities both relaxed. In all cases restoration and working flow variables were also relaxed.

None of these strategies yielded useful lower bounds for the J0 problem. Basically, whenever the edge variables are relaxed the solution is fast but meaningless and, regardless of other relaxations when the edge variables are not relaxed, the problem takes virtually as long to run as the un-relaxed problem. It was already commented above and observed by Gendron [13] on FCR problems that the "best bound (LP)" produced by the MIP solver is extremely loose, so much as to be practically meaningless because it corresponds to relaxation of the 1/0 edge variables as well as all flows and capacities. For the MTRS problem, we found the full LP relaxations solved very quickly (all under 3 min.) but were (on average) 55% below the optimum or J3 heuristic solutions. In fact the MTRS-LP relaxation was always lower that the W1 (FCR) sub-problem of the heuristic alone, clearly demonstrating its lack of utility as a lower bound (and helping to explain why the MIP solver performs so poorly on the full MTRS problem).

In contrast, we found that the capacity-related relaxations Wrlx, Srlx, WSrlx are essentially as difficult for the CPLEX MIP solver as the un-relaxed problem. In nearly all cases, after run times of one hour, the objective values of the J0 relaxations were actually worse than those of the non-relaxed J3 solutions. None of the un-relaxed J0 problems that did not terminate in 6 hours (for which bounds would be the most useful) reached a full termination in capacity-relaxed form either within 6 hours. This is again consistent with the complexity being dominated by the edge decisions, not the solution of routing and capacity.

CONCLUSION

The complexity of the complete problem of topology, routing and spare capacity design for a span-restorable network (MTRS) is very high but that the proposed heuristic produces good solutions very quickly. The heuristic is based on a view of the constituent problems that MTRS contains. It has some aspects that are like a classic FCR problem, which inspires Step W1. It has other aspects that are like a mesh spare capacity design problem, but where we have to also augment the topology for two-connectedness. This inspires Step S2. The central hypothesis was that within the set-union of the edges from W1 and S2, a restricted instance of the full problem could find a good solution in far less time than the unrestricted problem. We feel this has been borne out by the results. In the two nine-node cases where the full MTRS problem could be solved to optimality the heuristic was within 6.5% and 7.7% of optimal and ran in minutes as opposed to up to 73 hours for the optimal solution. More typically in the trial cases on 10, 15, 20, 23 and 26 nodes we do not know the actual gap to optimality because the reference solutions could not be solved to optimality. In these cases we can only report that the heuristic typically produces a result in 30 to 60 minutes that cannot then be improved upon in up to 18 hours of run time on the full MTRS problem, and that the best feasible solution found by running the full problem for 6 to 12 hours remain 50% to 150% above the heuristic result.

Figure 6A:
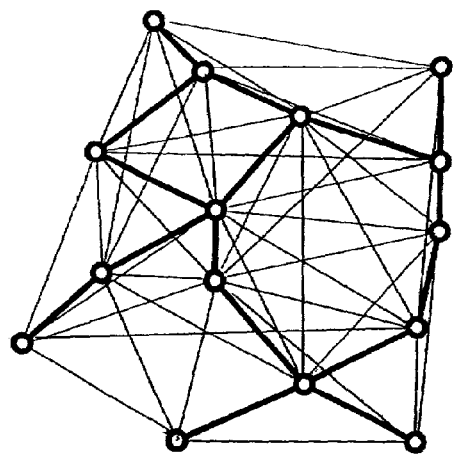
FIGS. 6A–6D are topologies from Round 1 Case 10: 15n56s1-20, in which FIG. 6A show the topology for end of Step W1 (16 edges)
Figure 6B:
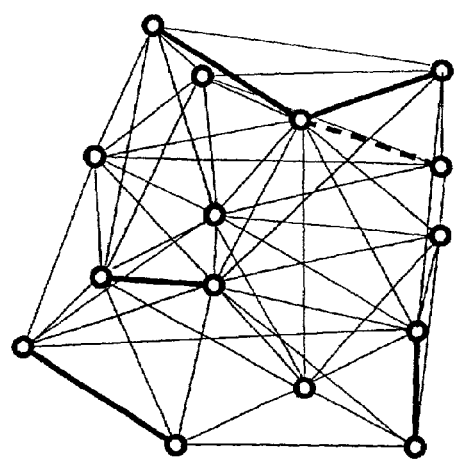
Figure 6C:
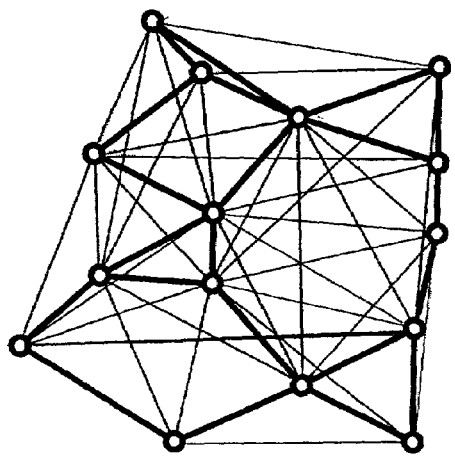
Figure 6D:
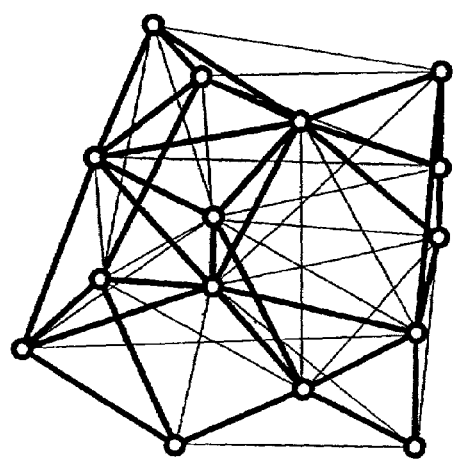

An unexpected aspect of the attempts at solving the optimal MTRS reference problems was the amount of time the MIP solver would spend before even reaching feasibility in cases where the J3 solution was provided as an upper bound. Related to this was the observation that when J0 runs without the bounds were stopped at 6 to 12 hours, their best solution was always associated with many more edges than were optimal. We think this is the key to why MTRS is so hard to solve by MIP methods. Combinatoric principles would have it that there are vastly more arrangements of closed connected graphs with many edges, than there are graphs that have relatively few edges that also describe a connected closed graph. For instance, there are far more arrangements of qualified graphs with 24 edges like FIG. 5D than with 16 edges like FIG. 5C. But with the LP relaxation being so loose the MIP progress could be roughly thought of as an almost random walk through the edge-vector space. If it was random, the probability that any node the MIP solver branches to is an even plausible solution graph is extremely low. While this is a simplification, it seems to describe the solver's inability to escape the combinatoric dominance of the overly-connected graphs in the topology space to even find one instance of a low weight closed connected edge vector. In FIGS. 5C and 6D as examples, it is clear that the MIP solver has yet to even discover one instance of a graph similar to those in to FIGS. 5C and 6D after 6 and 12 hours, respectively. The solver is wading around in a combinatoric space in which lightweight closed and connected graphs (like FIGS. 5C, 6D) are extremely rare. Any guidance effect the solver is getting from the loose LP relaxation is swamped by the combinatoric dominance of graphs like FIG. 5D as opposed to FIG. 5C.

This also suggests a view of MTRS as a problem which straddles two kinds of problem domains. Usually, in optimization problems with LP/IP methods, there is a vast space of feasible solutions and the problem is to find one that minimizes some cost objective. But another domain of problems are feasibility problems where it is the existence or discovery of a feasible solution that is the challenge. The latter kind of problem is more the purview of Constraint Programming [55]. We offer a view of MTRS as containing a significant feasibility problem in the construction of low-weight edge vectors that describe closed connected graphs that are even qualified and plausible as transport network graphs, coupled with an optimization problem for routing and capacity. An alternative approach might use a combination of a Constraint Programming approach for the topology aspect, with Integer Linear Programming for the routing and capacity aspects.

Another approach is to use an algorithmic search or enumeration strategies for graph feasability and then use a J3 instance to solve the MTRS. The motivation for this also lies in the apparent wheel spinning of the MIP solver in trying to find qualified plausible graphs, because it is not that difficult to construct such candidate graphs directly by hand, and hence by implication through some algorithmic process. Indeed we saw that amongst the set of 18 pseudo-random edge-sets provided to J3 in paragraphs 106–108 two gave surprisingly good results. This differs from Zoom-In in that Zoom-In uses an algorithmic search to propose graphs on which routing and capacity is solved for evaluation, while the J3 step that would be used in our suggestion is handed edge-sets amongst which it selects a subgraph as well as solving the routing and capacity problems. Thus, the front-end search feeding J3 need only come across an edge set that contains the optimal topology for J3 to result in an optimal solution, whereas the same outcome in the Zoom-In approach would require the topology searcher to exactly stipulate the optimal graph, not just an edge set containing it. If this approach is developed the use of IP solutions for the W1, S2 and J3 stages might remain useful for quick one-time solutions of reasonable quality for MTRS, while an iterative edge-set proposer coupled with a J3 solver can search as long as desired for improved solutions.

Immaterial variations of the proposed method of the invention may be made without departing from the essence of the invention.

REFERENCES

[1] R. D. Doverspike, B. Wilson, "Comparison of capacity efficiency of DCS network restoration routing techniques," *Journal of Networks and System Management*, Vol. 2, No. 2, pp. 95–123, 1994.

[2] A. Kershenbaum, *Telecommunications Network Design Algorithms*, McGraw-Hill, New York, N.Y., (1993).

[3] B. Gavish, Topological design of telecommunication networks—Local access design methods, *Annals of Operations Research,* 33:(1991) 17–71.

[4] A. Balakrishnan, T. L. Magnanti and R. T. Wong, A decomposition network expansion planning, *Operations Research,* 43:(1995) 58–76.

[5] T. G. Robertazzi, *Planning Telecommunication Networks,* IEEE Press, 1999, pp. 66–72.

[6] B. Gavish "Backbone network design tools with economic tradeoffs", ORSA J. on Computing, 2:236–252, 1990

[7] Robert S. Cahn, Wide Area Network Design—Concepts and Tools for Optimization, Morgan Kaufman Publishers, San Francisco, 1998, Chapters 8, 9.

[8] K. Maruyama, "Designing reliable packet switched networks", Proc. IEEE ICC, p493–498, 1978

[9] M. Suruagy, J. M. Gerla, R. Pazos, "Topology design and bandwidth allocation in ATM networks", IEEE JSAC, 7:1253–1262, 1989

[10] W. Chou, M. Gerla, H. Frank, J. Eckl, "A cut saturation algorithm for topological design of packet switched networks", Proc. *IEEE National Telcom. Conf,* pp. 1074–1085, December 1974.

[11] G. Grover, A. Kershenbaum, P. Kermani, "MENTOR: an algorithm for mesh network topological optimization and routing", *IEEE Trans. Comm,* 39: 503–513, 1991

[12] B. Yaged, Minimum cost routing for static network models, *Networks,* vol. 1, 1971, pp. 139–172.

[13] B. Gendron, T. G. Crainic, A. Frangioni, Multicommodity capacitated network design, in: *Telecommunications Network Planning,* eds. B. Sanso, P. Soriano, Kluwer Academic, 1999, pp. 1–19.

[14] F. R. B Cruz, J. Macgregor Smith, G. R. Mateus, "Solving to optimality the uncapacitated fixed-charge network flow problem", *Computers and Operation Research,* vol. 25, issue 1,1998, pp. 67–81.

[15] P. Soriano, C. Wynants, R. Seguin, M. Labbe, M. Gendreau, B. Fortz, Design and dimensioning of survivable SDH/SONET Networks, in: *Telecommunications Network Planning,* eds. B. Sanso, P. Soriano, Kluwer Academic, 1999, pp. 148–167.

[16] H. Sakauchi, Y. Nishimura, S. Hasegawa, A self-healing network with an economical spare-channel assignment, Proc. IEEE Globecom, (1990) pp 438–443.

[17] B. D. Venables, Algorithms for the Spare Capacity Design of Mesh Restorable Networks. *M.Sc. Thesis,* University of Alberta, Edmonton. (1992)

[18] M. Herzberg, and S. Bye, "An optimal spare-capacity assignment model for survivable networks with hop limits," *Proc. IEEE GLOBECOM '94,* pp. 1601–1607, 1994.

[19] R. R. Iraschko, M. H. MacGregor, W. D. Grover, "Optimal Capacity Placement for Path Restoration in STM or ATM Mesh-Survivable Networks", *IEEE/ACM Trans. Networking,* Vol. 6, No. 3, pp. 325–336, June 1998.

[20] J. Doucette, W. D. Grover, "Influence of Modularity and Economy-of-scale Effects on Design of Mesh-Restorable DWDM Networks," *IEEE JSAC Special Issue on Protocols and Architectures for Next Generation Optical WDM Networks,* vol. 18, no. 10, October 2000, pp. 1912–1923

[21] P. F. Fonseca, "Pan-European multi-wavelength transport networks: network design, architecture, survivability and SDH networking", Proc. 1st Int. Workshop *Design of Reliable Comm. Networks (DRCN'98),* IMEC, U. Ghent, Brugge, Belgium, May 17–20, 1998, paper P3.

[22] Y. Miyao, H. Saito, "Optimal Design and Evaluation of Survivable WDM Transport Networks", *IEEE Journal on Selected Areas in Communications,* Vol. 16, No. 7, pp. 1190–1198, September 1998.

[23] B. Van Caenegem, W. Van Parys, F. De Turck, P. M. Demeester "Dimensioning of Survivable WDM Networks", *IEEE Journal on Selected Areas in Communications,* Vol. 16, No. 7, pp. 1146–1157, September 1998.

[24] R. Kawamura, K. Sato, I. Tokizawa, "Self-healing ATM networks based on virtual path concept," *IEEE J. Sel. Areas in Comm., vo.* 12, no. 1, 1994, pp. 120–127.

[25] Chujo, T., Komine, H., Miyazaki, K., Ogura, T., Soejima, T., "Distributed self-healing network and its optimum spare capacity assignment algorithm", *Electronics and Commun. in Japan,* part 1, vol. 74, no. 7, 1991, pp. 1–8.

[26] W. D. Grover, D. Y. Li, "The Forcer Concept and Express Route Planning in Mesh Survivable Networks", *Journal of Network and Systems Management,* vol. 7, No. 2, February–March 1999, pp. 199–223.

[27] K. Murakami, and H. Kim, "Joint optimization of capacity and flow assignment for self-healing ATM networks," *Proc. IEEE ICC'95,* pp. 216–220, 1995.

[28] D. Medhi, "A unified approach to network survivability for teletraffic networks: models, algorithms and analysis, *IEEE Trans. on Communications,* vol. 42, 1994, pp.534–548.

[29] D. Medhi, R. Khurana, "Optimization and performance of network restoration schemes for wide-area teletraffic networks", *Journal of Network and Systems Management,* vol. 3, no. 3, September 1995.

[30] M. Pioro, M. Szczesniak, "Application of the Dual Benders Decomposition Approach to the design of multilayer robust telecommunication networks", in *Proc. Design of Reliable Communication Networks,* Munich, Germany April 2000, pp. 68–73.

[31] M. Pickavet, P. Demeester, "Long term planning of WDM networks: a comparison between single-period and multi-period techniques", *Photonic Network Communications,* vol. 1, no. 4, December 1999, pp. 331–346.

[32] T. Cinkler, T. Henk, G. Gordos, "Stochastic algorithms for thrifty single-failure-protected networks", in Proc. *Design of Reliable Communication Networks,* Munich, Germany April 2000, pp. 299–303.

[33] *The Role of Digital Crossconnect Systems in Transport Network Survivability,* SR-NWT-002514, Issue 1, Bellcore Special Report, January 1993

[34] Problem files are available at http://www.ee.ualberta.ca/~grover/ in association with the listing for this paper.

[35] See information on the Level(3) facilities-based network at www.Level3.com

[36] M. Pickavet, P. Demeester, "A Zoom-In approach to design SDH mesh-restorable networks," *Journal of Heuristics Special Edition on Heuristic Approaches for Telecommunications Network Management, Planning and Expansion,* vol. 6, no. 1, April 2000, pp. 103–126.

[37] R. K. Ahuja, T. L. Magnanti, J. B. Orlin, *Network Flows: Theory, Algorithms and Applications,* Prentice Hall, 1993, p. 447.

[38] Y. Wang, *Modelling and solving single and multiple facility restoration problems,* Ph.D. dissertation, Sloan School of Management, MIT, June 1998., pp.32–33.

[39] M. Bettin, G. Ferraris, G. Pignari, "Comparison of Protection and Restoration Schemes for SDH Networks", *First Int. Workshop on the Design of Reliable Comm. Networks,* DRCN '98, Brugge, Belgium, 1998.

[40] O. Gerstel, R. Ramaswami, "Optical layer survivability—An implementation perspective," *IEEE JSAC Spe-* cial Issue on Next Generation Optical WDM Networks, vol. 18, no. 10, October 2000, pp. 1885–1899.

[41] W. D. Grover, "Distributed Restoration of the Transport Network", in *Network Management into the 21st Century*, editors T. Plevyak, S. Aidarous, IEEE/IEE Press co-publication, Chapter 11, pp. 337–417, February 1994.

[42] W. D. Grover, T. D. Bilodeau, B. D. Venables, "Near Optimal Spare Capacity Planning in a Mesh Restorable Network", *IEEE GLOBECOM '91*, pp. 2007–2012, 1991.

[43] W. D. Grover, V. Rawat, M. MacGregor, "A Fast Heuristic Principle for Spare Capacity Placement in Mesh-Restorable Sonet/SDH Transport Networks", *Electronics Letters*, vol. 33, no. 3, pp. 195–196, Jan. 30, 1997.

[44] B. D. Venables, W. Grover, M. H. MacGregor, "Two strategies for Spare Capacity Placement in Mesh Restorable Networks", Proc. *IEEE ICC '93*, Geneva, May 1993, pp. 267–271.

[45] W. D. Grover, R. R. Iraschko, Y. Zheng, "Comparative Methods and Issues in Design of Mesh-Restorable STM and ATM Networks," in *Telecommunication Network Planning*, B. Sanso, P. Soriano (editors), Kluwer Academic Publishers, 1999, pp. 169–200.

[46] A. Lardies, A. Aguilar, "Planning Methodology for SDH+Optical Networks", First Int. Workshop on the *Design of Reliable Comm. Networks, DRCN '98*, Belgium, 1998.

[47] R. Bhandari, *Survivable Networks: Algorithms for Diverse Routing*, Kluwer Academic, November 1998.

[48] B. Mukherjee, "WDM optical communication networks: progress and challenges," *IEEE Journal Selected Areas in Communications*, vol. 18, no. 10, October 2000, pp. 1810–1824.

[49] W. D. Grover, "Self-organizing Broad-band Transport Networks", *Proceedings of the IEEE Special Issue on Communications in the 21st Century*, vol. 85, no. 10, October 1997, pp. 1582–1611.

[50] Y. Xiong; L. G. Mason, "Restoration strategies and spare capacity requirements in self-healing ATM networks" *IEEE/ACM Transactions on Networking*, Volume: 7 Issue: 1, February 1999, pp. 98–110

[51] Y. Zheng, W. D. Grover, M. H. MacGregor, "Broadband Network Design with Controlled Exploitation of Flow-Convergence Overloads in ATM VP-Based Restoration", in Proc. *Can. Conf. on Broadband Research (CCBR '97)*, Ottawa, Apr. 16–17, 1997, pp. 172–183.

[52] R. R. Iraschko, W. D. Grover, "A highly efficient path-restoration protocol for management of optical network transport integrity", *IEEE Journal of Selected Areas in Communications*, vol. 18, no. 5, May 2000, pp. 779–793.

[53] W. D. Grover, R. G. Martens, "Forcer-Clipping: A Principle for Economic Design of Ring-Mesh Hybrid Transport Networks", (in press) *Journal of Information Technology and Management, Special Issue on Communication Networks: Design and Management*, accepted June 2000 (38 ms).

[54] J. L. Kennington, M. W. Lewis, The Path Restoration Version of the Spare Capacity Allocation Problem with Modularity Restrictions: Models, Algorithms, and an Empirical Analysis, *Technical Report* 98-CSE-13, Department of Computer Science And Engineering, Southern Methodist University, Dallas, December 1998.

[55] I. J. Lustig, "Constraint Programming and its Relationship to Mathematical Programming", ILOG Corp., Gentilly, France, December 2000.

TABLE 1

Round 1 Test Case Results

| No. | Test Case | Step W1 Obj. | Step W1 CPU (s) | Step S2 Obj | Step S2 CPU (s) | Step J3 Obj. | Step J3 CPU (s) | MTRS Ref. Sol'n (J0) Obj. | MTRS Ref. Sol'n (J0) CPU | With Bounds | Gap (%) |
|---|---|---|---|---|---|---|---|---|---|---|---|
| 1 | 9n36s1-15 | 12416 | 156.08 | 9367 | 3.33 | 19056 | 1.52 | 18476 | 6 h(TL) | | 3.1 |
| 2 | 9n36s2-15 | 11996 | 177.33 | 11329 | 14.54 | 18809 | 1.81 | 18811 | 6 h(TL) | 18 h(IF) | 0.0 |
| 3 | 9n36s3-15 | 11346 | 70.23 | 8328 | 5.27 | 17956 | 1.04 | 18020 | 6 h(TL) | 6 h(IF) | 0.0 |
| 4 | 9n36s4-15 | 12621 | 300 | 9954 | 10.98 | 20560 | 1.39 | 19094 | | 73 h(FT) | 7.7 |
| 5 | 10n45s1-15 | 14464 | 2608 | 11050 | 28.09 | 22964 | 3.85 | 23691 | 6 h(TL) | 6 h(IF) | 0.0 |
| 6 | 10n45s2-15 | 14542 | 1595 | 10100 | 40.58 | 23300 | 2.42 | 23471 | 6 h(TL) | 6 h(IF) | 0.0 |
| 7 | 10n45s3-15 | 14463 | 1985 | 12340 | 22.76 | 21160 | 7.11 | 26416 | 6 h(TL) | 18 h(IF) | 0.0 |
| 8 | 10u45s4-15 | 14384 | 1077 | 12400 | 105.74 | 22850 | 12.33 | 29309 | 6 h(TL) | 18 h(IF) | 0.0 |
| 9 | 15n28s1-20 | 16459 | 402.75 | 15617 | 57.73 | 27841 | 51.08 | 26131 | 477 s(FT) | | 6.5 |
| 10 | 15n56s1-20 | 13933 | 900 | 10069 | 244.40 | 22225 | 8.21 | 25248 | 12 h(TL) | 6 h(IF) | 0.0 |
| 11 | 15n26s1-40 | 18749 | 900 | 12461 | 61.90 | 29005 | 9.25 | 31134 | 6 h (TL) | 6 h(IF) | 0.0 |

TABLE 2

Number of edges employed at W1, S2, J3 stages in Round 1 Results

| No. | Test Case | Step W1 | Step S2 (tot, new) | Step J3 | MTRS Ref. Sol'n (J0) | Notes on edge evolution W1–S2 |
|---|---|---|---|---|---|---|
| 1 | 9n36s1-15 | 9 | 13, 4 | 13 | 17 | all added edges at Step S2 were for closure. |
| 2 | 9n36s2-15 | 9 | 14, 5 | 14 | n/a[a] | only 4 edges of the 5 added edges needed for graph closure. |
| 3 | 9n36s3-15 | 10 | 13, 3 | 13 | n/a | S2 3 edges added, all effect graph-closure. |

TABLE 2-continued

Number of edges employed at W1, S2, J3 stages in Round 1 Results

| No. | Test Case | Step W1 | Step S2 (tot, new) | Step J3 | MTRS Ref. Sol'n (J0) | Notes on edge evolution W1–S2 |
|---|---|---|---|---|---|---|
| 4 | 9n36s4-15 | 9 | 12, 3 | 12 | 15 (optimal) | S2 3 edges added, all effect graph-closure. |
| 5 | 10n4Ss1-15 | 11 | 15, 4 | 15 | n/a | S2 2 of 4 added edges effect closure. |
| 6 | 10n45s2-15 | 12 | 14, 2 | 14 | n/a | S2 2 edges, both effect closure. |
| 7 | 10n45s3-15 | 10 | 13*, 6 | 16 | n/a | S2 5 of 6 edges effect closure, 1 is non-planar, 3 edges from WI disused. |
| 8 | 10n45s4-15 | 11 | 13*, 5 | 16 | n/a | all 5 edges effect closure, 1 non-planar, 2 edges from WI disused. |
| 9 | 15n28s1-20 | 15 | 22*, 8 | 21 | 20 (optimal) | 6 of 8 edges added for closure, 1 from W1 disused |
| 10 | 15n56s1-20 | 16 | 20*, 5 | 21 | 26 (at 12 h) | 4 edges added for closure, 1 from W1 disused. |
| 11 | 15n56s1-40 | 15 | 19*, 5 | 20 | 22 (at 6 h) | 4 of 5 edges added for closure, 1 edge from W1 disused. |

<sup>a</sup>n/a = not available because no feasible solution was found by CPLEX that improved upon the heuristic result in the time available when J0 was provided with J3 objective as an upper bound.

TABLE 3

Round 2 Test Case Results

| | | Omega | | Step 1 - FCR (W1) | | | | | Step 2 - RN-FCS (S2) | | | | | |
|---|---|---|---|---|---|---|---|---|---|---|---|---|---|---|
| Case # | Network | J3–J10 | W1-S2 | Soln Edges | Work | Total Cost | Time | Notes | Soln Edges | Work | Spare | Total Cost | Time | Notes |
| 1 | 19n74s | 5 | 5 | 30 | 779 | 175887 | 1 h | TL | 41 | 779 | 391 | 189217 | 1 h | TL |
| 2 | 19n74s | 20 | 20 | 25 | 927 | 268556 | 1 h | TL | 34 | 927 | 640 | 436263 | 1 h | TL |
| 3 | 19n74s | 50 | 50 | 21 | 1027 | 358564 | 1 h | TL | 28 | 1027 | 1014 | 626966 | 1 h | TL |
| 4 | 19n74s | 50 | 20 | 25 | 927 | 268556 | 1 h | TL | 34 | 927 | 640 | 436263 | 1 h | TL |
| 5 | 19n74s | 50 | 5 | 30 | 779 | 175887 | 1 h | TL | 41 | 779 | 391 | 189217 | 1 h | TL |
| 6 | 19n74s | 100 | 100 | 19 | 1158 | 474780 | 1 h | TL | 26 | 1158 | 1095 | 884711 | 1 h | TL |
| 7 | 19n74s | 100 | 50 | 21 | 1027 | 358664 | 1 h | TL | 28 | 1027 | 1014 | 826966 | 1 h | TL |
| 8 | 19n74s | 100 | 20 | 25 | 927 | 268558 | 1 h | TL | 34 | 927 | 640 | 436263 | 1 h | TL |
| 9 | 19n74s | 100 | 5 | 30 | 779 | 175887 | 1 h | TL | 41 | 779 | 391 | 189217 | 1 h | TL |
| 10 | 19n74s | 200 | 200 | 18 | 1225 | 760079 | 1968 s | FT | 26 | 1225 | 1267 | 1418588 | 1 h | TL |
| 11 | 20n80s1 | 5 | 5 | 37 | 1230 | 8337 | 30 min | TL | 43 | 1230 | 700 | 128741 | 327 s | FT |
| 12 | 20n80s1 | 20 | 20 | 30 | 1313 | 115754 | 30 min | TL | 36 | 1313 | 931 | 177061 | 2526 s | FT |
| 13 | 20n80s1 | 50 | 50 | 26 | 1544 | 162196 | 30 min | TL | 33 | 1544 | 1183 | 247783 | 404 s | FT |
| 14 | 20n80s1 | 50 | 20 | 30 | 1313 | 115754 | 30 min | TL | 36 | 1313 | 931 | 177081 | 2526 s | FT |
| 15 | 20n80s1 | 50 | 5 | 37 | 1230 | 83337 | 30 min | TL | 43 | 1230 | 700 | 128741 | 327 s | FT |
| 16 | 20n80s1 | 100 | 100 | 22 | 1889 | 196301 | 30 min | TL | 27 | 1889 | 1841 | 331495 | 756 s | FT |
| 17 | 20n80s1 | 100 | 50 | 26 | 1544 | 162196 | 30 min | TL | 33 | 1544 | 1183 | 247783 | 404 s | FT |
| 17b | 20n80s1 | 100 | 50 | 26 | 1544 | 162196 | 30 min | TL | 33 | 1544 | 1183 | 247783 | 404 s | FT |
| 18 | 20n80s1 | 100 | 20 | 30 | 1313 | 115754 | 30 min | TL | 36 | 1313 | 931 | 177061 | 2526 s | FT |
| 19 | 20n80s1 | 100 | 5 | 37 | 1230 | 83337 | 30 min | TL | 43 | 1230 | 700 | 128741 | 327 s | FT |
| 20 | 23n92s1 | 5 | 5 | 54 | 1543 | 111104 | 30 min | TL | 58 | 1543 | 695 | 114484 | 308 s | FT |
| 21 | 23n92s1 | 20 | 20 | 49 | 1820 | 148026 | 30 min | TL | 49 | 1820 | 974 | 193140 | 224 s | FT |
| 22 | 23n92s1 | 60 | 50 | 41 | 1999 | 207036 | 30 min | TL | 42 | 1989 | 1241 | 275742 | 523 s | FT |
| 23 | 23n92s1 | 50 | 20 | 49 | 1820 | 146026 | 30 min | TL | 49 | 1820 | 974 | 193140 | 224 s | FT |
| 24 | 23n92s1 | 50 | 5 | 54 | 1543 | 111104 | 30 min | TL | 58 | 1543 | 695 | 114484 | 306 s | TL |
| 25 | 23n92s1 | 100 | 100 | 34 | 2262 | 293504 | 30 min | TL | 39 | 2262 | 1668 | 405752 | 2 h | TL |
| 26 | 23n92s1 | 100 | 50 | 41 | 1989 | 207038 | 30 min | TL | 42 | 1969 | 1241 | 275742 | 523 s | FT |
| 27 | 23n92s1 | 100 | 20 | 49 | 1820 | 146062 | 30 min | TL | 49 | 1820 | 974 | 193140 | 224 s | FT |
| 28 | 23n92s1 | 100 | 5 | 54 | 1543 | 111104 | 30 min | TL | 58 | 1543 | 695 | 114484 | 308 s | FT |
| 29 | 26n104s1 | 5 | 5 | 65 | 2086 | 149284 | 30 min | TL | 70 | 1086 | 948 | 151543 | 1387 s | FT |
| 30 | 26n104s1 | 20 | 20 | 61 | 2249 | 196826 | 30 min | TL | 66 | 2249 | 1065 | 265442 | 1617 s | FT |
| 31 | 26n104s1 | 50 | 50 | 48 | 2450 | 278366 | 30 min | TL | 53 | 2450 | 1382 | 378105 | 7580 s | FT |
| 32 | 26n104s1 | 50 | 20 | 61 | 2249 | 196826 | 30 min | TL | 66 | 2249 | 1065 | 265442 | 1617 s | FT |
| 33 | 26n104s1 | 50 | 5 | 66 | 2086 | 149284 | 30 min | TL | 70 | 2086 | 948 | 151543 | 1387 s | FT |
| 34 | 26n104s1 | 100 | 100 | 38 | 2924 | 327145 | 30 min | TL | 52 | 2924 | 1407 | 535283 | 2947 s | FT |
| 35 | 26n104s1 | 100 | 50 | 48 | 2450 | 278366 | 30 min | TL | 53 | 2450 | 1382 | 378105 | 7589 s | FT |
| 36 | 26n104s1 | 100 | 20 | 61 | 2249 | 196626 | 30 min | TL | 66 | 2249 | 1065 | 265442 | 1617 s | FT |
| 37 | 26n104s1 | 100 | 5 | 65 | 2086 | 149284 | 30 min | TL | 70 | 2066 | 948 | 151543 | 1387 s | FT |

TABLE 3-continued

Round 2 Test Case Results

| | Step 3 - Reduced MTRS (J3) | | | | | | Full MTRS Reference (J0) | | | | | | |
|---|---|---|---|---|---|---|---|---|---|---|---|---|---|
| Case # | Soln Edges | Work | Spare | Total Cost | Time | Notes | Cap/Edga Ratio | Soln Edges | Work | Spare | Total Cost | Time | Notes | J0 vs J3 |
| 1 | 40 | 690 | 249 | 180951 | 1 h | TL | 4.45 | — | — | — | — | 6 h | IF | |
| 2 | 32 | 811 | 406 | 370712 | 1922 s | FT | 1.64 | 47 | 675 | 275 | 562737 | 6 h | TL | 52% |
| 3 | 27 | 955 | 704 | 550897 | 67 s | FT | 1.05 | 47 | 680 | 273 | 1052290 | 6 h | TL | 91% |
| 4 | 30 | 836 | 450 | 588046 | 4.2 h | FT | 0.74 | 47 | 680 | 273 | 1052290 | 6 h | TL | 85% |
| 5 | 29 | 859 | 628 | 587448 | 1 h | TL | 0.94 | 47 | 680 | 273 | 1052290 | 5 h | TL | 85% |
| 6 | 26 | 979 | 745 | 812501 | 55 s | FT | 0.56 | 47 | 699 | 297 | 1859926 | 6 h | TL | 129% |
| 7 | 26 | 967 | 736 | 819038 | 173 s | FT | 0.56 | 47 | 699 | 297 | 1859926 | 6 h | TL | 127% |
| 8 | 29 | 891 | 510 | 880614 | 1 h | TL | 0.43 | 47 | 699 | 297 | 1859926 | 6 h | TL | 111% |
| 9 | 29 | 850 | 564 | 876440 | 1 h | TL | 0.45 | 47 | 699 | 297 | 1859926 | 6 h | TL | 112% |
| 10 | 25 | 1039 | 906 | 1304441 | 14 s | FT | 0.33 | 47 | 667 | 258 | 3416372 | 6 h | TL | 162% |
| 11 | 42 | 1132 | 473 | 117958 | 1 h | TL | 7.12 | — | — | — | — | 6 h | IF | |
| 12 | 34 | 1304 | 725 | 161824 | 1 h | TL | 2.89 | — | — | — | — | 6 h | IF | |
| 13 | 30 | 1442 | 915 | 211814 | 4.85 h | FT | 1.51 | 50 | 975 | 378 | 390327 | 6 h | TL | 84% |
| 14 | 30 | 1439 | 995 | 215094 | 1 h | TL | 1.56 | 50 | 975 | 376 | 390327 | 6 h | TL | 81% |
| 15 | 35 | 1356 | 716 | 214690 | 1 h | TL | 1.17 | 50 | 975 | 376 | 390327 | 6 h | TL | 82% |
| 16 | 27 | 1545 | 1334 | 291701 | 53 s | FT | 1.01 | 50 | 973 | 368 | 661389 | 6 h | TL | 127% |
| 17 | 27 | 1506 | 1138 | 292191 | 1 h | TL | 0.94 | 50 | 973 | 368 | 661389 | 6 h | TL | 125% |
| 17b | 26 | 1546 | 1181 | 291557 | 19 h | TL | 1.00 | 50 | 973 | 368 | 661389 | 6 h | TL | 127% |
| 18 | 27 | 1561 | 1146 | 297905 | 1 h | TL | 0.95 | 50 | 973 | 368 | 661389 | 6 h | TL | 122% |
| 19 | 33 | 1402 | 877 | 307709 | 1 h | TL | 0.67 | 50 | 973 | 368 | 661389 | 6 h | TL | 115% |
| 20 | 56 | 1467 | 505 | 138860 | 1 h | TL | 6.18 | — | — | — | — | 6 h | IF | |
| 21 | 46 | 1867 | 747 | 179559 | 1 h | TL | 2.79 | — | — | — | — | 6 h | IF | |
| 22 | 37 | 2019 | 1163 | 248430 | 1 h | TL | 1.68 | 57 | 1429 | 594 | 522385 | 12 h | TL | 110% |
| 23 | 43 | 1903 | 850 | 245551 | 1 h | TL | 1.27 | 57 | 1429 | 594 | 522385 | 12 h | TL | 113% |
| 24 | 55 | 1518 | 518 | 310218 | 1 h | TL | 0.65 | 57 | 1429 | 594 | 522385 | 12 h | TL | 68% |
| 25 | 34 | 2189 | 1490 | 353929 | 1 h | TL | 1.05 | 57 | 1452 | 606 | 886352 | 12 h | TL | 150% |
| 26 | 36 | 2082 | 1295 | 342366 | 1 h | TL | 0.91 | 57 | 1452 | 606 | 886352 | 12 h | TL | 159% |
| 27 | 40 | 2037 | 999 | 348026 | 1 h | TL | 0.74 | 57 | 1452 | 606 | 886352 | 12 h | TL | 155% |
| 28 | 53 | 1604 | 625 | 471918 | 1 h | TL | 0.36 | 57 | 1452 | 606 | 886352 | 12 h | TL | 88% |
| 29 | — | — | — | — | 1 h | IF | — | — | — | — | — | 6 h | IF | |
| 30 | — | — | — | — | 1 h | IF | — | — | — | — | — | 6 h | IF | |
| 31 | 46 | 2460 | 1206 | 329184 | 1 h | TL | 1.55 | — | — | — | — | 6 h | IF | |
| 32 | 63 | 2189 | 833 | 363048 | 1 h | TL | 0.90 | — | — | — | — | 6 h | IF | |
| 33 | — | — | — | — | 1 h | IF | — | — | — | — | — | 6 h | IF | |
| 34 | 49 | 2429 | 1217 | 476991 | 1 h | TL | 0.70 | — | — | — | — | 6 h | IF | |
| 35 | 46 | 2443 | 1278 | 460137 | 1 h | TL | 0.77 | — | — | — | — | 6 h | IF | |
| 36 | 83 | 2196 | 800 | 557119 | 1 h | TL | 0.45 | — | — | — | — | 6 h | IF | |
| 37 | — | — | — | — | 1 h | IF | — | — | — | — | — | 6 h | IF | |

TABLE 4

Tests of psuedo-random graphs in lieu of W1 andd S2 stages

| Case # | Edges Provided | Sol'n Edges | Work | Spare | Total Cost | Time | Notes | Relative to Heuristic |
|---|---|---|---|---|---|---|---|---|
| R1 | 23 | 23 | 1868 | 1966 | 364533 | 10 s | FT | 25.0% |
| R2 | 23 | 23 | 1703 | 1802 | 383670 | 14 s | FT | 31.5% |
| R3 | 25 | 25 | 1782 | 1807 | 361916 | 15 s | FT | 24.1% |
| R4 | 25 | 25 | 1558 | 1519 | 407775 | 17 s | FT | 39.8% |
| R5 | 27 | 25 | 1573 | 1358 | 316187 | 190 s | FT | 8.4% |
| R6 | 27 | 26 | 1524 | 1167 | 319695 | 138 s | FT | 9.6% |
| R7 | 30 | 28 | 1395 | 965 | 355795 | 3053 s | FT | 22.0% |
| R8 | 30 | 26 | 1535 | 1271 | 344227 | 1 h | FT | 18.0% |
| R9 | 33 | 29 | 1434 | 929 | 300523 | 1 h | TL | 3.0% |
| R10 | 33 | 28 | 1416 | 1113 | 323439 | 1 h | TL | 10.9% |
| R11 | 35 | 28 | 1461 | 1113 | 295196 | 1 h | TL | 1.2% |
| R12 | 35 | 28 | 1469 | 1157 | 328582 | 1 h | TL | 12.6% |
| R13 | 36 | 30 | 1477 | 928 | 296331 | 1 h | TL | 1.6% |
| R14 | 36 | 29 | 1507 | 1199 | 317478 | 1 h | TL | 8.8% |
| R15 | 40 | 28 | 1588 | 1274 | 300662 | 1 h | TL | 3.1% |
| R16 | 40 | 29 | 1502 | 1133 | 306676 | 1 h | TL | 5.1% |
| R17 | 45 | 31 | 1510 | 1052 | 303753 | 1 h | TL | 4.1% |
| R18 | 45 | 32 | 1496 | 1089 | 308545 | 1 h | TL | 5.8% |

We claim:

1. A method of designing a telecommunications network, the method comprising the steps of:
   A) for all working demand flows required to be routed in the telecommunications network, finding an initial topology of spans between nodes in the telecommunications network that is sufficient for routing all working demand flows, while attempting to minimize the cost of providing the spans;
   B) given the initial topology of spans identified in step A, finding a set of additional spans that ensures restorability of working demand flows that are required to be restored in case of failure of any span in the initial topology of spans, while attempting to minimize the cost of providing additional spans; and
   C) starting with the initial topology of spans and the additional spans identified in step B, finding a final topology of spans between nodes in the telecommunications network that attempts to minimize the total cost of the final topology of spans, while routing all working demand flows and ensuring restorability of working demand flows required to be restored in case of failure of any span in the final topology of spans.

2. The method of claim 1 in which method step B attempts to jointly optimize the addition of new spans and the routing of working demand flows.

3. The method of claim 1 in which finding the final topology of spans is subject to a constraint limiting the average nodal degree of the final topology of spans.

4. The method of claim 1 in which the working demand flows that are required to be restored are all working demand flows required to be routed in step A.

5. The method of claim 1 in which finding the final topology of spans is subject to a constraint limiting the hop length of any restoration path.

6. The method of claim 1 in which steps A, B and C are each an iterative process that comprises applying a sifter at each iteration to remove unreasonable solutions for the respective step.

7. The method of claim 1 in which finding the final topology of spans is subject to a constraint limiting the connectedness of the final topology of spans.

8. The method of claim 1 in which the final topology of spans is a two-connected topology.

9. The method of claim 1 in which the final topology of spans is a bi-connected topology.

10. The method of claim 1 in which finding the final topology of spans uses an integer programming formulation.

11. A method of implementing a telecommunications network, the method comprising the steps of:
    A) for all working demand flows required to be routed in the telecommunications network, finding an initial topology of spans between nodes in the telecommunications network that is sufficient for routing all working demand flows, while attempting to minimize the cost of providing the spans;
    B) given the initial topology of spans identified in step A, finding a set of additional spans that ensures restorability of working demand flows that are required to be restored in case of failure of any span in the initial topology of spans, while attempting to minimize the cost of providing additional spans;
    C) starting with the initial topology of spans and the additional spans identified in step B, finding a final topology of spans between nodes in the telecommunications network that attempts to minimize the total cost of the final topology of spans, while routing all working demand flows and ensuring restorability of working demand flows required to be restored in case of failure of any span in the final topology of spans; and
    D) implementing the final topology of spans.

12. The method of claim 11 in which method step B attempts to jointly optimize the addition of new spans and the routing of working demand flows.

13. The method of claim 11 in which finding the final topology of spans is subject to a constraint limiting the average nodal degree of the final topology of spans.

14. The method of claim 11 in which the working demand flows that are required to be restored are all working demand flows required to be routed in step A.

15. The method of claim 11 in which finding the final topology of spans is subject to a constraint limiting the hop length of any restoration path.

16. The method of claim 11 in which steps A, B and C are each an iterative process that comprises applying a sifter at each iteration to remove unreasonable solutions for the respective step.

17. The method of claim 11 in which finding the final topology of spans is subject to a constraint limiting the connectedness of the final topology of spans.

18. The method of claim 11 in which the final topology of spans is a two-connected topology.

19. The method of claim 11 in which the final topology of spans is a bi-connected topology.

20. The method of claim 11 in which finding the final topology of spans uses an integer programming formulation.

21. A method of modifying a telecommunications network to account for new working demand flows, the method comprising the steps of:
    A) for all working demand flows required to be routed in the telecommunications network including new working demand flows, finding an initial topology of spans between nodes in the telecommunications network that is sufficient for routing all working demand flows, while attempting to minimize the cost of providing the spans;
    B) given the initial topology of spans identified in step A, finding a set of additional spans that ensures restorability of working demand flows that are required to be restored in case of failure of any span in the initial topology of spans, while attempting to minimize the cost of providing additional spans;
    C) starting with the initial topology of spans and the additional spans identified in step B, finding a final topology of spans between nodes in the telecommunications network that attempts to minimize the total cost of the final topology of spans, while routing all working demand flows and ensuring restorability of working demand flows required to be restored in case of failure of any span in the final topology of spans; and
    D) implementing the final topology of spans by adding new spans to the telecommunications network.

22. The method of claim 21 in which method step B attempts to jointly optimize the addition of new spans and the routing of working demand flows.

23. The method of claim 21 in which finding the final topology of spans is subject to a constraint limiting the average nodal degree of the final topology of spans.

24. The method of claim 21 in which the working demand flows that are required to be restored are all working demand flows required to be routed in step A.

25. The method of claim 21 in which finding the final topology of spans is subject to a constraint limiting the hop length of any restoration path.

26. The method of claim 21 in which steps A, B and C are each an iterative process that comprises applying a sifter at each iteration to remove unreasonable solutions for the respective step.

27. The method of claim 21 in which finding the final topology of spans is subject to a constraint limiting the connectedness of the final topology of spans.

28. The method of claim 21 in which the final topology of spans is a two-connected topology.

29. The method of claim 21 in which the final topology of spans is a bi-connected topology.

30. The method of claim 21 in which finding the final topology of spans uses an integer programming formulation.

* * * * *